(12) United States Patent
Cavallini et al.

(10) Patent No.: US 10,910,947 B2
(45) Date of Patent: Feb. 2, 2021

(54) SINGLE INDUCTOR MULTIPLE OUTPUT REGULATOR WITH HYBRID NEGATIVE AND POSITIVE RAIL GENERATION

(71) Applicant: Dialog Semiconductor (UK) Limited, London (GB)

(72) Inventors: Pier Cavallini, Swindon (GB); Nicola Macri, Feldkirchen (DE); Kemal Ozanoglu, Istanbul (TR)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/528,914

(22) Filed: Aug. 1, 2019

(65) Prior Publication Data
US 2020/0212801 A1 Jul. 2, 2020

(30) Foreign Application Priority Data
Dec. 31, 2018 (DE) .................. 10 2018 222 905

(51) Int. Cl.
*H02M 3/158* (2006.01)
*H02M 1/08* (2006.01)
*H02M 1/00* (2006.01)

(52) U.S. Cl.
CPC .......... *H02M 3/158* (2013.01); *H02M 1/08* (2013.01); *H02M 2001/009* (2013.01)

(58) Field of Classification Search
CPC ..... H02M 3/156–158; H02M 3/15884; H02M 3/1588; H02M 1/08; H02M 1/10;
(Continued)

(56) References Cited

U.S. PATENT DOCUMENTS 4,654,769 A 3/1987 Middlelbrook
8,044,719 B2 * 10/2011 Norimatsu .............. H03F 3/217
330/207 A
(Continued)

FOREIGN PATENT DOCUMENTS

WO WO 2011/135012 11/2011

OTHER PUBLICATIONS

German Office Action, File No. 10 2018 222 905.8, Applicant: Dialog Semiconductor (UK) Limited, dated Oct. 23, 2019, 8 pages, and English language translation, 6 pages.
"Single-Inductor-Multiple-Output Switching DC-DC Converters," by Dongwon Kwon et al., IEEE Transactions on Circuits and Systems-II: Express Briefs, vol. 56, No. 8, Aug. 2009, pp. 614-618.
"On the Design of Single-Inductor Multiple-Output DC-DC Buck Converters," by Massimiliano Belloni et al., 2008 IEEE International Symposium on Circuits and Systems, May 18-21, 2008, pp. 3049-3052.
(Continued)

*Primary Examiner* — Yemane Mehari
(74) *Attorney, Agent, or Firm* — Saile Ackerman LLC; Stephen B. Ackerman

(57) ABSTRACT

DC-DC voltage regulators for converting an input voltage into one or more output voltages and methods for operating such voltage regulators are described. The voltage regulator may have a high side switching device coupled between the input port and a first intermediate node. The voltage regulator may have an inductive element having one port coupled to the first intermediate node and may have a capacitive element having two ports, coupled between the first intermediate node and a second intermediate node, with its one port coupled to the first intermediate node. The voltage regulator may have a charging switching device coupled between the other port of the capacitive element and a predetermined voltage level, for charging the capacitive element when the high side switching device and the charging switching device are both in an ON state.

21 Claims, 15 Drawing Sheets

(58) Field of Classification Search
CPC ......... H02M 2001/009; Y02B 70/1466; G05F 3/24; H02J 1/102
USPC ................................ 323/265, 271, 272, 282
See application file for complete search history.

(56) References Cited

U.S. PATENT DOCUMENTS

| | | | | |
|---|---|---|---|---|
| 8,773,082 | B2* | 7/2014 | Urakabe | H02M 3/07 323/225 |
| 10,063,147 | B2* | 8/2018 | Hoyerby | H02M 3/07 |
| 10,110,120 | B2* | 10/2018 | Hoyerby | H02M 1/088 |
| 2010/0231298 | A1* | 9/2010 | Norimatsu | H03F 3/217 330/251 |
| 2012/0032664 | A1 | 2/2012 | Coleman et al. | |
| 2015/0028839 | A1 | 1/2015 | Petrovic et al. | |
| 2015/0098562 | A1 | 4/2015 | Rossi et al. | |
| 2017/0324321 | A1* | 11/2017 | Hoyerby | H02M 1/088 |
| 2017/0331374 | A1* | 11/2017 | Hoyerby | H02M 3/07 |

OTHER PUBLICATIONS

"Mixed-Signal Controlled Hybrid Converter Topologies," by Aleksandar Prodic, Laboratory for Power Management and Integrated SMPS, University of Toronto, E. Rogers ECE Department, IEEE Compel 2016, pp. 1-71.

"A Hybrid Inductor-Based Flying-Capacitor-Assisted Step-Up/Step-Down DC-DC Cpnverter with 96.56 % Efficiency," 2017 IEEE International Solid-State Circuits Conference (ISSCC), Feb. 5-9, 2017, pp. 184-186.

"A Three-Level Single-Inductor Triple-Output Converter with an Adjustable Flying-Capacitor Technique for Low Output Ripple and Fast Transient Response," by Li-Cheng Chu et al., 2017 IEEE International Solid-State Circuits Conference, Feb. 5-9, 2017, pp. 186-188.

"Multi-Level Conversion: High Voltage Choppers and Voltage-Source Inverters," by T.A. Meynard, et al., PESC '92 Record. 23rd Annual IEEE Power Electronics Specialists Conference, Jun. 29-Jul. 3, 1992, pp. 397-403.

* cited by examiner

SINGLE INDUCTOR MULTIPLE OUTPUT REGULATOR WITH HYBRID NEGATIVE AND POSITIVE RAIL GENERATION

TECHNICAL FIELD

This disclosure relates to switching DC-DC voltage regulators. More particularly, the disclosure relates to Single Inductor Multiple Output (SIMO) regulators having both positive and negative voltage rails.

BACKGROUND

Due to the growing need to reduce, in number or size, unnecessary board components to allow manufacturers of smart mobile solutions to integrate additional features and reduce the cost of material, the market for mobile applications has seen in the recent past an increase in the demand for compact voltage regulators.

SIMO structures attract a lot of interest, because a single inductor in a compact environment and under a variable switching control scheme offers the benefit of reduced Electromagnetic interference (EMI) and reduced board area. However, limitations on the minimum coil size exist mainly associated with the maximum current rating in the coil. Large coils increase the size and the cost of a specific application.

SUMMARY

Thus, there is a need for switching DC-DC voltage regulators with improved performance that allow for smaller coil sizes but also for reducing the voltage stress on the active switching components such that less resilient devices which are more efficient in terms of silicon area can be used. There is further need for methods of operating such switching DC-DC voltage regulators.

In view of some or all of these needs, the present disclosure proposes a DC-DC voltage regulator and a method of operating a DC-DC voltage regulator, having the features of the respective independent claims.

An aspect of the disclosure relates to a DC-DC voltage regulator for converting an input voltage at an input port into one or more output voltages at respective output ports. The voltage regulator may comprise a high side switching device. The high side switch may be coupled between the input port and a first intermediate node. The voltage regulator may further comprise an inductive element (e.g., an inductor). One port of the inductive element may be coupled to the first intermediate node. The voltage regulator may further comprise a capacitive element (e.g., a capacitor) having two ports. The capacitive element (capacitor) may be referred to as a flying capacitor or a floating capacitor. The capacitive element may be coupled between the first intermediate node and a second intermediate node, with its one port coupled to the first intermediate node. The voltage regulator may further comprise a negative output rail coupled between the second intermediate node and one of the output ports. The negative output rail may generate a negative voltage at the respective output port. The negative voltage may for example be as low as −23V, or for example in a range of −5V to −9V. The negative output rail may comprise a low side switching device. The voltage regulator may further comprise a charging switching device coupled between the other port of the capacitive element and a predetermined voltage level. The predetermined voltage level may for example be VSS or ground (GND). Generally speaking, the charging switching device may be used for charging the capacitive element when the high side switching device and the charging switching device are both in an ON state (conductive state). Any switching devices mentioned in this disclosure may be transistor devices, such as MOSFETs.

Configured as proposed, the voltage drop on the inductive element during switching can be reduced. Correspondingly, the current slope of discharge across the inductive element is also decreased. Notably, this is valid not only for a SIMO topology (with multiple output rails), but in general also for a single output rail. Consequently, this helps to enable the use of smaller coils and to increase the power conversion efficiency. Moreover, by reducing the voltage drop on the switching device of the negative rail, the proposed structure helps to eliminate the need for cascade devices which normally leads to increasing power efficiency and silicon area and to eliminate (or reducing) the body diode conduction of the switching device of the output rail, thereby preventing the losses related to the recovery charge to affect the power conversion efficiency. Additionally, by reducing the voltage drop on the switching device of the (negative) output rail, the proposed structure allows for further extending the output voltage range to values beyond typical process limitations.

In some embodiments, the voltage regulator may comprise one or more further negative output rails. Each of the one or more further negative output rails may comprise a respective low side switching device coupled between the second intermediate node and a respective output port. The one or more negative output rails may generate respective negative voltages at the respective output ports.

In some embodiments, the voltage regulator may further comprise one or more second capacitive elements (e.g., capacitors). Further, for each of the one or more second capacitive elements, the voltage regulator may comprise a respective intermediate switching device, a respective bypass switching device and a respective second charging switching device. In particular, the intermediate switching devices and the second capacitive elements may be alternatingly coupled in series between the other port of the capacitive element and the second intermediate node. Further, each of the bypass switching devices may be coupled between the first intermediate node and a port of the respective second capacitive element which is coupled to the respective intermediate switching device. Yet further, each of the second charging switching devices may be coupled between the other port of the respective second capacitive element and the predetermined voltage level. Configured as such, the respective second capacitive element may be charged when the high side switching device, the respective bypass switching device and the respective second charging device are all in the ON state (conductive state).

By using multiple (flying) capacitors coupled in series, the voltage drop over the coil of the inductive element may be further reduced during the de-magnetization phase when the (negative) output voltage is generated. The actual configuration of the voltage regulator (e.g., number of stages of capacitors, bypass switching devices, intermediate switching devices and charging switching devices) may be determined depending on different implementation circumstances, as the skilled person will appreciate.

In some embodiments, the voltage regulator may further comprise an intermediate output port coupled to the other port of one of the one or more second capacitive elements. Configured as such, an intermediate output voltage may be provided at the intermediate output port. In other words, the intermediate voltage may be provided by tapping on the intermediate output port (which can be coupled to one port of any capacitive element). The intermediate output voltage may be different from the output voltages at respective output rails. In particular, the absolute value (i.e., modulus) of the (negative) intermediate output voltage is lower than the absolute value of the maximum negative output voltage among the multiple negative output rails.

In some embodiments, the voltage regulator may further comprise a boost low side switching device coupled between the other port of the inductive element and the predetermined voltage level (e.g., VSS or GND). Further, the voltage regulator may comprise a positive output rail coupled between a respective output port and a third intermediate node. The third intermediate node may be arranged between the other port of the inductive element and the boost low side switching device. The positive output rail may comprise a boost high side switching device. In particular, the positive output rail may generate a positive output voltage at the respective output port.

In some embodiments, the voltage regulator may comprise one or more further positive output rails. Each of the one or more further positive output rails may comprise a respective boost high side switching device coupled between the third intermediated node and a respective output port. The one or more positive output rails may generate respective positive voltages at the respective output ports.

In some embodiments, the voltage regulator may further comprise a first switching device coupled between the one port of the capacitive element and the first intermediate node. The first switching device may be used for switchably connecting the one port of the capacitive element to the first intermediate node. The voltage regulator may further comprise a second switching device coupled between the one port of the capacitive element to the output port of the positive output rail. The second switching device may be used for switchably connecting the one port of the capacitive element to the output port of the positive output rail.

In some embodiments, the low side switching device of the respective negative output rail may be formed by two transistors (e.g., MOSFETs) coupled in series in a back-to-back configuration. In the examples of MOSFET, the back-to-back configuration may refer to the configuration where the drain terminal of one MOSFET is (directly) connected to the source terminal of the other MOSFET, or vice versa. Configured as such, the cross conduction effect between (negative) multiple output rails may be avoided (reduced). Similar back-to-back configuration may also be applied to the positive output rails. That is to say, the boost high side switching device of the respective positive output rail may also be formed by two transistors in the back-to-back configuration, in order to avoid (reduce) the cross conduction between multiple (positive) output rails.

Another aspect of the disclosure relates to a DC-DC voltage regulator for converting an input voltage at an input port into one or more output voltages at respective output ports. The voltage regulator may comprise a high side switching device. The high side switching device may be coupled between the input port and a first intermediate node. The voltage regulator may further comprise a first switching device, a capacitive element (e.g., capacitor) and a charging switching device coupled in series between the first intermediate node and a first predetermined voltage level. The capacitive element (capacitor) may be referred to as a flying capacitor or a floating capacitor. The predetermined voltage level may for example be VSS or ground (GND). The voltage regulator may further comprise an inductive element (e.g., an inductor) and a boost low side switching device coupled in series between the first intermediate node and the first predetermined voltage level. The voltage regulator may further comprise a negative output rail. The negative output rail may be coupled between a first output port and a second intermediate node. The second intermediate node may be arranged between one port of the capacitive element and the charging switching device. The negative output rail may comprise a low side switching device. The negative output rail may generate a negative voltage at the respective output port. The negative voltage may for example be as low as −23V, or for example in a range of −5V to −9V. Additionally, the voltage regulator may further comprise a positive output rail. The positive output rail may be coupled between a second output port and a third intermediate node. The third intermediate node may be arranged between the inductive element and the boost low side switching device. The positive output rail may comprise a boost high side switching device. The positive output rail may generate a positive output voltage at the respective output port. Yet further, the voltage regulator may comprise a second switching device. The second switching device may be coupled between a second voltage level and the other port of the capacitive element. In particular, the second voltage level may be higher than the first predetermined voltage level.

In some embodiments, the voltage regulator may further comprise a second capacitive element (e.g., a second capacitor). The second capacitive element (capacitor) may be referred to as a second flying capacitor or a second floating capacitor. The second capacitive element may be coupled between the third intermediate node and the positive output rail. A fourth intermediate node may be arranged between the second capacitive element and the positive output rail. The voltage regulator may further comprise a third switching device. The third switching device may be coupled between the input port and the fourth intermediate node.

In some embodiments, the second voltage level is the respective output voltage at the output port of the positive output rail. In this case, the second switching device may be coupled between the output port of the respective output rail and the other port of the capacitive element.

In some embodiments, the second voltage level may be an external (auxiliary) supply voltage. The external supply voltage may be different from the input voltage and the positive output voltage. In particular, the second voltage level is lower than the absolute value of the maximum negative output voltage that needs to be generated.

Configured as proposed, a lower voltage drop over the coil of the inductive element may be utilized during the de-magnetization phase when the (negative) output voltage is generated, thereby further improve the system performance.

In some embodiments, the low side switching device of the respective negative output rail may be formed by two transistors (e.g., MOSFETs) coupled in series in a back-to-back configuration. In the examples of MOSFET, the back-to-back configuration may refer to the configuration where the drain terminal of one MOSFET is (directly) connected to the source terminal of the other MOSFET, or vice versa. Configured as such, the cross conduction effect between (negative) multiple output rails may be avoided (reduced). Similar back-to-back configuration may also be applied to the positive output rails. That is to say, the boost high side switching device of the respective positive output rail may also be formed by two transistors in the back-to-back configuration, in order to avoid (reduce) the cross conduction between multiple (positive) output rails.

Another aspect of the disclosure relates to a DC-DC voltage regulator for converting an input voltage at an input port into one or more output voltages at respective output ports. The voltage regulator may comprise a high side switching device. The high side switching device may be coupled between the input port and a first intermediate node. The voltage regulator may further comprise an inductive element (e.g., inductor) and a capacitive element (e.g., capacitor) coupled in series between the first intermediate node and a second intermediate node. The voltage regulator may further comprise one or more positive output rails. Each of the one or more positive output rail may be coupled between the second intermediate node and a respective output port and may comprise a respective boost high side switching device. The one or more positive output rails may generate respective positive output voltages at respective output ports. The voltage regulator may further comprise a switching device. The switching device may be coupled between the input port and the second intermediate node. Yet further, the voltage regulator may comprise a charging switching device. The charging switching device may be coupled between a first predetermined voltage level and a third intermediate node. The third intermediate node may be arranged between the inductive element and the capacitive element. The (first) predetermined voltage level may for example be VSS or ground (GND). In particular, the charging switching device may be used for charging the capacitive element when the switching device and the charging switching device are both in an ON state.

In some embodiments, the voltage regulator may further comprise a second switching device, a second capacitive element (e.g., capacitor) and a second charging switching device coupled in series between the first intermediate node and the first predetermined voltage level. The voltage regulator may further comprise a third switching device coupled between a second voltage level and a fourth intermediate node. The fourth intermediate node may be arranged between the second switching device and one port of the second capacitive element. The second voltage level may be higher than the (first) predetermined voltage level. Additionally, the voltage regulator may further comprise one or more negative output rails coupled between the other port of the second capacitive element and the respective output ports, each comprising a respective low side switching device. The one or more negative output rails may generate respective negative output voltages at respective output ports.

In some embodiments, the second voltage level is the respective output voltage at the output port of the positive output rail. In this case, the second switching device may be coupled between the output port of the respective output rail and the other port of the capacitive element.

In some embodiments, the second voltage level may be an external (auxiliary) supply voltage. The external supply voltage may be different from the input voltage. In particular, the second voltage level is lower than the absolute value of the maximum negative output voltage that needs to be generated.

In some embodiments, the low side switching device of the respective negative output rail may be formed by two transistors (e.g., MOSFETs) coupled in series in a back-to-back configuration. In the examples of MOSFET, the back-to-back configuration may refer to the configuration where the drain terminal of one MOSFET is (directly) connected to the source terminal of the other MOSFET, or vice versa. Configured as such, the cross conduction effect between (negative) multiple output rails may be avoided (reduced).

Similar back-to-back configuration may also be applied to the positive output rails. That is to say, the boost high side switching device of the respective positive output rail may also be formed by two transistors in the back-to-back configuration, in order to avoid (reduce) the cross conduction between multiple (positive) output rails.

Another aspect of the disclosure relates to a method for operating a DC-DC voltage regulator for converting an input voltage at an input port into one or more output voltages respectively at respective output ports. The voltage regulator may comprise a high side switching device coupled between the input port and a first intermediate node. The voltage regulator may further comprise an inductive element (e.g., inductor) having one port coupled to the first intermediate node. The voltage regulator may further comprise a capacitive element (e.g., capacitor) having two ports, coupled between the first intermediate node and a second intermediate node, with its one port coupled to the first intermediated node. The voltage regulator may further comprise a negative output rail coupled between the second intermediate node and one of the output ports. The negative output rail may comprise a low side switching device and may generate a negative voltage at the respective output port. Yet further, the voltage regulator may also comprise a charging switching device coupled between the other port of the capacitive element and a predetermined voltage level. The predetermined voltage level may for example be VSS or ground (GND). Configured as such, the method may comprise a first operation phase and a second operation phase. In the first operation phase, the high side switching device and the charging switching device may both be switched to an ON state (conductive state) and the low side switching device may be switched to an OFF state (non-conductive state). During the first operation phase, the capacitive element may be charged. In the second operation phase, the high side and the charging switching devices may both be switched to the OFF state and the low side switching device may be switched to the ON state. During the second operation phase, an output voltage at the output port of the respective (negative) output rail may be generated. The generated output voltage may be a negative output voltage.

In some embodiments, the voltage regulator may comprise one or more further negative output rails. Each of the one or more further negative output rails may comprise a respective low side switching device coupled between the second intermediate node and a respective output port. The one or more negative output rails may generate respective negative voltages at the respective output ports. Configured as such, the method may further comprise, in the second operation phase, switching the high side and the charging switching devices to the OFF state and switching one of the low side switching devices to the ON state. In this way, an output voltage may be generated at the respective output port of the negative output rail of the one of the low side switching devices during the second operation phase. The generated output voltage may be a negative output voltage.

In some embodiments, the voltage regulator may further comprise one or more second capacitive elements (e.g., capacitors). Further, for each of the one or more second capacitive elements, there may comprise a respective intermediate switching device, a respective bypass switching device and a respective second charging switching device. In particular, the intermediate switching devices and the second capacitive elements may be alternatingly coupled in series between the other port of the capacitive element and the second intermediate node. Further, each of the bypass switching devices may be coupled between the first intermediate node and a port of the respective second capacitive element coupled to the respective intermediate switching device. Yet further, each of the second charging switching devices may be coupled between the other port of the respective second capacitive element and the predetermined voltage level. Configured as such, the method may further comprise, for a given one among the one or more second capacitive elements, switching the respective second charging switching device and the respective bypass switching device to the ON state in the first operation phase. In this way, the given second capacitive element may be charged during the first operation phase. The method may further comprise, in the second operation phase, switching the respective intermediate switching device coupled to the given second capacitive element to the ON state and switching the respective seconding charging switching device and respective bypass switching device to the OFF state. During the second operation phase, an output voltage at the output port of the respective (negative) output rail may be generated. The generated output voltage may be a negative output voltage.

By using multiple (flying) capacitors coupled in series, the voltage drop over the coil of the inductive element may be further reduced during the second operation phase (de-magnetization phase) when the (negative) output voltage is generated. As will be illustrated in the detailed description, the actual configuration of the voltage regulator (e.g., number of stages of capacitors, bypass switching devices, intermediate switching devices and charging switching devices) may be determined depending on different implementation circumstances, as the skilled person will appreciate.

In some embodiments, the voltage regulator may further comprise an intermediate output port coupled to the other port of one of the one or more second capacitive elements. Configured as such, the method may further comprise providing an intermediate output voltage at the intermediate output port. The intermediate output voltage may be different from the output voltages at respective output rails. In particular, the absolute value (i.e., modulus) of the (negative) intermediate output voltage is lower than the absolute value of the maximum negative output voltage among the multiple negative output rails.

In some embodiments, the voltage regulator may further comprise a boost low side switching device coupled between the other port of the inductive element and the predetermined voltage level (e.g., VSS or GND). Further, the voltage regulator may comprise a positive output rail coupled between a respective output port and a third intermediate node. The third intermediate node may be arranged between the other port of the inductive element and the boost low side switching device. The positive output rail may comprise a boost high side switching device. Configured as such, the method may further comprise switching the boost low side switching device to the ON state and switching the boost high side switching device to the OFF state in both the first and second operation phases.

In some embodiments, the method may further comprise a third operation phase and a fourth operation phase. In particular, in the third operation phase, the high side switching device and the boost low side switching device may be switched to the ON state and the low side switching device, the charging switching device and the boost high side switching device may be switched to the OFF state. Further, in the fourth operation phase, the boost low side switching device may be switched to the OFF state and the boost high side switching device may be switched to the ON state. In this way, a positive output voltage may be generated at the respective output port of the respective (positive) output rail.

Another aspect of the disclosure relates to a method for operating a DC-DC voltage regulator for converting an input voltage at an input port into one or more output voltages respectively at respective output ports. The voltage regulator may comprise a high side switching device coupled between the input port and a first intermediate node. The voltage regulator may further comprise a first switching device, a capacitive element (e.g., capacitor) and a charging switching device coupled in series between the first intermediate node and a first predetermined voltage level. The capacitive element (capacitor) may be referred to as a (first) flying capacitor or a floating capacitor. The predetermined voltage level may for example be VSS or ground (GND). The voltage regulator may further comprise an inductive element (e.g., an inductor) and a boost low side switching device coupled in series between the first intermediate node and the first predetermined voltage level. The voltage regulator may further comprise a negative output rail coupled between a first output port and a second intermediate node arranged between one port of the capacitive element and the charging switching device. The negative output rail may comprise a low side switching device. Additionally, the voltage regulator may further comprise a positive output rail coupled between a second output port and a third intermediate node arranged between the inductive element and the boost low side switching device. The positive output rail may comprise a boost high side switching device. Further, the voltage regulator may comprise a second switching device coupled between a second voltage level and the other port of the capacitive element. In particular, the second voltage level may be higher than the first predetermined voltage level. Configured as such, the method may comprise a first operation phase and a second operation phase. In the first operation phase, the high side switching device, the second switching device, the boost low side switching device, and the charging switching device may be switched to an ON state and the first switching device, the low side switching device, and the boost high side switching device may be switched to an OFF state. Further, in the second operation phase, the first switching device, the boost low side switching device, and the low side switching device may be switched to the ON state and the high side switching device, the boost high side switching device, the second switching device, and the charging switching device may be switched to the OFF state. In this way, the negative output rail may generate a negative voltage at the respective output port. The negative voltage may for example be as low as –23V, or for example in a range of –5V to –9V.

Configured as proposed, a lower voltage drop over the coil of the inductive element may be utilized during the de-magnetization phase when the (negative) output voltage is generated, thereby further improve the system performance.

Another aspect of the disclosure relates to a method for operating a DC-DC voltage regulator for converting an input voltage at an input port into one or more output voltages respectively at respective output ports. The voltage regulator may comprise a high side switching device coupled between the input port and a first intermediate node. The voltage regulator may further comprise an inductive element (e.g., inductor) and a capacitive element (e.g., capacitor) coupled in series between the first intermediate node and a second intermediate node. The voltage regulator may further comprise one or more positive output rails, each coupled between the second intermediate node and a respective output port and comprising a respective boost high side switching device. The voltage regulator may further comprise a switching device coupled between the input port and the second intermediate node. Further, the voltage regulator may comprise a charging switching device coupled between a first predetermined voltage level and a third intermediate node arranged between the inductive element and the capacitive element. The first predetermined voltage level may for example be VSS or ground (GND). Configured as such, the method may comprise a first operation phase and a second operation phase. In the first operation phase, the switching device and the charging switching device may be switched to an ON state and all the boost high side switching devices may be switched to an OFF state. Further, in the second operation phase, the high side and a selected boost high side switching device of the one or more positive output rails may be switched to the ON state and the switching device and the charging switching device may be switched to the OFF state. In this way, the positive output rail may generate a positive voltage at the respective output port.

In some embodiments, the voltage regulator may further comprise a second switching device, a second capacitive element (e.g., capacitor) and a second charging switching device coupled in series between the first intermediate node and the first predetermined voltage level. The voltage regulator may further comprise a third switching device coupled between the respective output port of one of the positive output rails and a fourth intermediate node arranged between the second switching device and one port of the second capacitive element. Additionally, the voltage regulator may further comprise one or more negative output rails coupled between the other port of the second capacitive element and the respective output ports, each comprising a respective low side switching device. Configured as such, the method may further comprise a third operation phase and a fourth operation phase. In particular, in the third operation phase, the high side switching device, the third switching device, the first charging switching device, and the second charging switching device may be switched to the ON state and all other switching devices may be switched to the OFF state. Further, in the fourth operation phase, the second switching device, the first charging switching device, and one of the low side switching devices may be switched to the ON state and all other switching devices may be switched to the OFF state. In this way, a negative output voltage may be generated at the respective output port of the respective (negative) output rail.

Configured as proposed, a lower voltage drop over the coil of the inductive element may be utilized during the de-magnetization phase when the (negative) output voltage is generated, thereby further improve the system performance.

The details of the disclosed method can be implemented as an apparatus adapted to execute some or all of the steps of the method, and vice versa, as the skilled person will appreciate. In particular, it is understood that methods according to the disclosure relate to methods of operating the circuits according to the above embodiments and variations thereof, and that respective statements made with regard to the circuits likewise apply to the corresponding methods.

It is also understood that in the present document, the term "couple" or "coupled" refers to elements being in electrical communication with each other, whether directly connected e.g., via wires, or in some other manner (e.g., indirectly). Notably, one example of being coupled is being connected.

BRIEF DESCRIPTION OF THE DRAWINGS

Example embodiments of the disclosure are explained below with reference to the accompanying drawings, wherein like reference numbers indicate like or similar elements, and wherein FIG. 1 schematically illustrates an example of a SIMO regulator with one positive and one negative output voltage rails, FIG. 2 schematically illustrates an example of control signal waveforms of the SIMO regulator of FIG. 1, FIG. 3 schematically illustrates an example of a DC-DC voltage regulator with one negative output rail and one positive output rail according to embodiments of the disclosure, FIG. 4 schematically illustrates an example of simulation results of the DC-DC voltage regulator of FIG. 3, FIG. 5 schematically illustrates an example of a DC-DC voltage regulator with single negative output rail according to embodiments of the disclosure, FIG. 6 schematically illustrates an example of an extension of the DC-DC voltage regulator of FIG. 5 to multiple stages, FIG. 7 schematically illustrates an example of an extension of the DC-DC voltage regulator of FIG. 3 to multiple stages, multiple negative output rails and multiple positive output rails, FIG. 8 schematically illustrates an example of an extension of the DC-DC voltage regulator of FIG. 5 to multiple negative output rails, FIG. 9 schematically illustrates an example of waveforms of the DC-DC voltage regulator of FIG. 8, FIG. 10 schematically illustrates another example of a DC-DC voltage regulator with one negative output rail and one positive output rail according to embodiments of the disclosure, FIG. 11 schematically illustrates an example of a DC-DC voltage regulator with multiple positive output rails according to embodiments of the disclosure, FIG. 12 schematically illustrates another example of a DC-DC voltage regulator with one negative output rail and one positive output rail according to embodiments of the disclosure, FIG. 13 schematically illustrates another example of a DC-DC voltage regulator with one negative output rail and one positive output rail according to embodiments of the disclosure.

DESCRIPTION

As indicated above, identical or like reference numbers in the disclosure indicate identical or like elements, and repeated description thereof may be omitted for reasons of conciseness. Any switching devices mentioned in this disclosure may be transistor devices, such as MOSFETs. In some figures the switching devices may be simplified, but they should be understood as the same or similar switching devices as shown in other figures.

Figure 1:
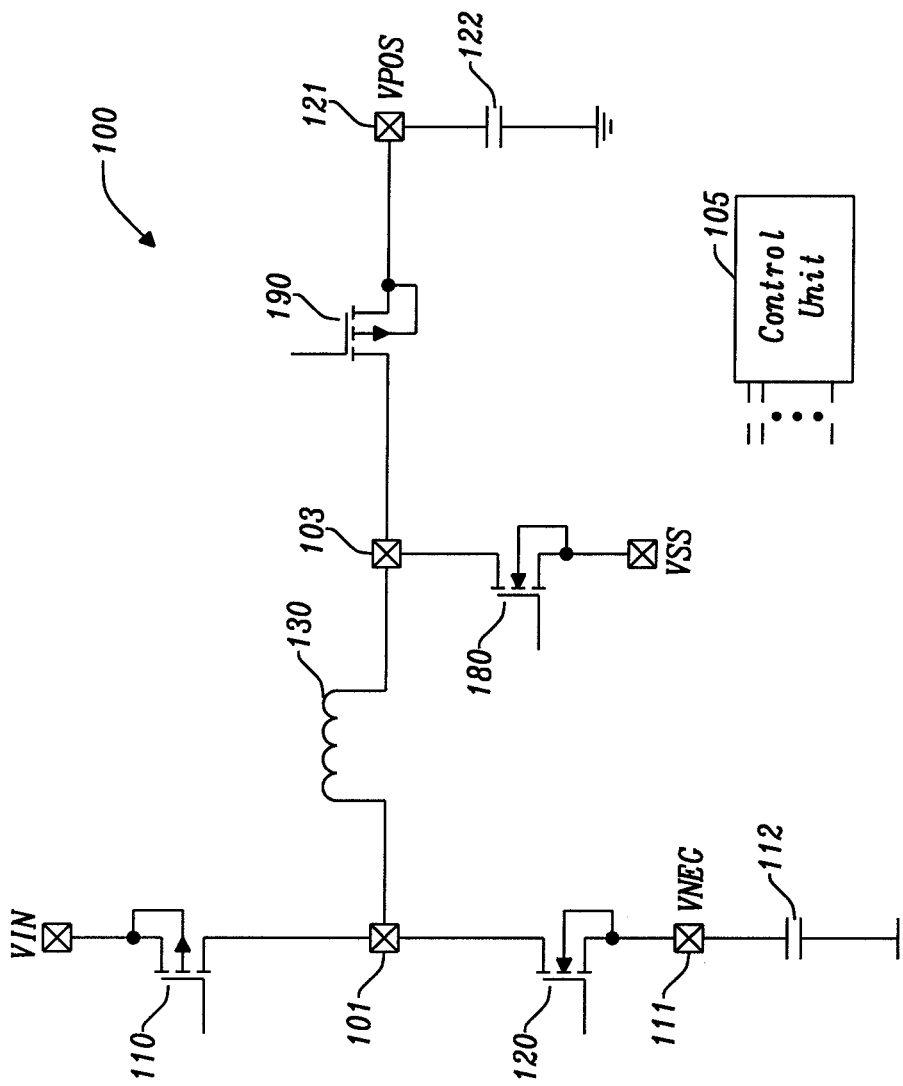

FIG. 1 schematically illustrates an example of a SIMO regulator 100 with one positive output voltage rail and one negative output voltage rail. Sometimes, such a SIMO regulator (i.e., with one positive output rail and one negative output rail) may be referred to as a Single Inductor Dual Output (SIDO) regulator.

In particular, the regulator 100 comprises a high side switching device (e.g., a transistor device) 110, an indicative element (e.g., an inductor) 130 and a boost low side switching device (e.g., a transistor device) 180 coupled in series between an input voltage level (VIN) and a predetermined voltage level. The predetermined voltage level may for example be VSS or ground (GND) or any other suitable reference voltage level. The regulator 100 further comprises a negative output rail and a positive output rail. The negative output rail comprises a low side switching device (e.g., a transistor device) 120 and is coupled between a first intermediate node 101 and an (negative) output node (port) 111. A negative output voltage level (VNEG) is generated at the negative output node 111. The first intermediate node 101 is arranged between the high side switching device 110 and the inductive element 130. Similarly, the positive output rail comprises a boost high side switching device (e.g., a transistor device) 190 and is coupled between a second intermediate node 103 and a (positive) output node 121. A positive output voltage level (VPOS) is generated at the positive output node 121. The second intermediate node 103 is arranged between the inductive element 130 and the boost low side switching device 180. As will be appreciated by the skilled person, the voltage regulator may comprise respective capacitors, namely capacitors 112 and 122, coupled between the respective output ports 111, 121 and ground. Finally, in order for operating the switching devices, the regulator may further comprises a control unit 105 for generating the corresponding control signals.

In order to generate the negative voltage VNEG at the negative output port 111, this SIMO regulator 100 is operated in two operation phases, namely a first operation phase and a second operation phase. In the first operation phase, the high side switching device 110 and the boost low side switching device 180 are switched to an ON state (a conducting state). The other switching devices are switched to an OFF state (a non-conducting state). By switching on only the high side switching device 110 and the boost low side switching device 180, current is being stored in the inductive element 130, until the current in the coil of the inductive element 130 has reached a designed peak value (Ipk). Thus, this phase may also be referred to as a magnetization phase (period). In particular, the duration of the magnetization period is proportional to L×Ipk/VIN. Subsequently, in the second operation phase, the low side switching device 120 and the boost low side switching device 180 are switched to the ON state while the other switching devices are switched to the OFF state. By switching on the low side switching device 120 and the boost low side switching device 180, current in the inductive element 130 is flowing to the predetermined voltage level (e.g., VSS) through the boost low side switching device 180. Consequently, the voltage on the capacitor 112 is reduced through the low side switching device 120, thereby generating a negative voltage level at VNEG, until the current stored in the coil of the inductive element 130 is (fully or partially) discharged. This phase may also be referred to as a de-magnetization phase. The duration of the de-magnetization period can be proportional to L×Ipk/(VIN+|VNEG|).

On the other hand, in order to generate the positive voltage VPOS at the positive output port 121, the SIMO regulator 100 is operated in another two operation phases, namely a third operation phase and a fourth operation phase (in order to differentiate from the first and second operation phases of the negative output voltage generation). In the third operation phase, the high side switching device 110 and the boost low side switching device 180 are switched to the ON state. The other switching devices are switched to the OFF state. Notably, the configuration of the switching devices in the third operation phase is the same as the configuration of the switching devices in the first operation phase. Thus, in the third operation phase (magnetization phase), current is being stored in the inductive element 130, until the current in the coil of the inductive element 130 has reached a designed peak value. Subsequently, in the fourth operation phase (de-magnetization phase), the high side switching device 110 and the boost high side switching device 190 are switched to the ON state while the other switching devices are switched to the OFF state. In this phase, current in the inductor 130 is flowing to VPOS through the boost high side switching device 190 and at the same time the capacitor 122 is charged. Thus, a positive voltage is generated at VPOS.

In particular, the generation of the VPOS and VNEG outputs is controlled via independent over or under voltage events and stops once the respective designated target voltage is reached. No overlap between the operation phases (i.e., the first to fourth operation phases) are allowed.

Figure 2:
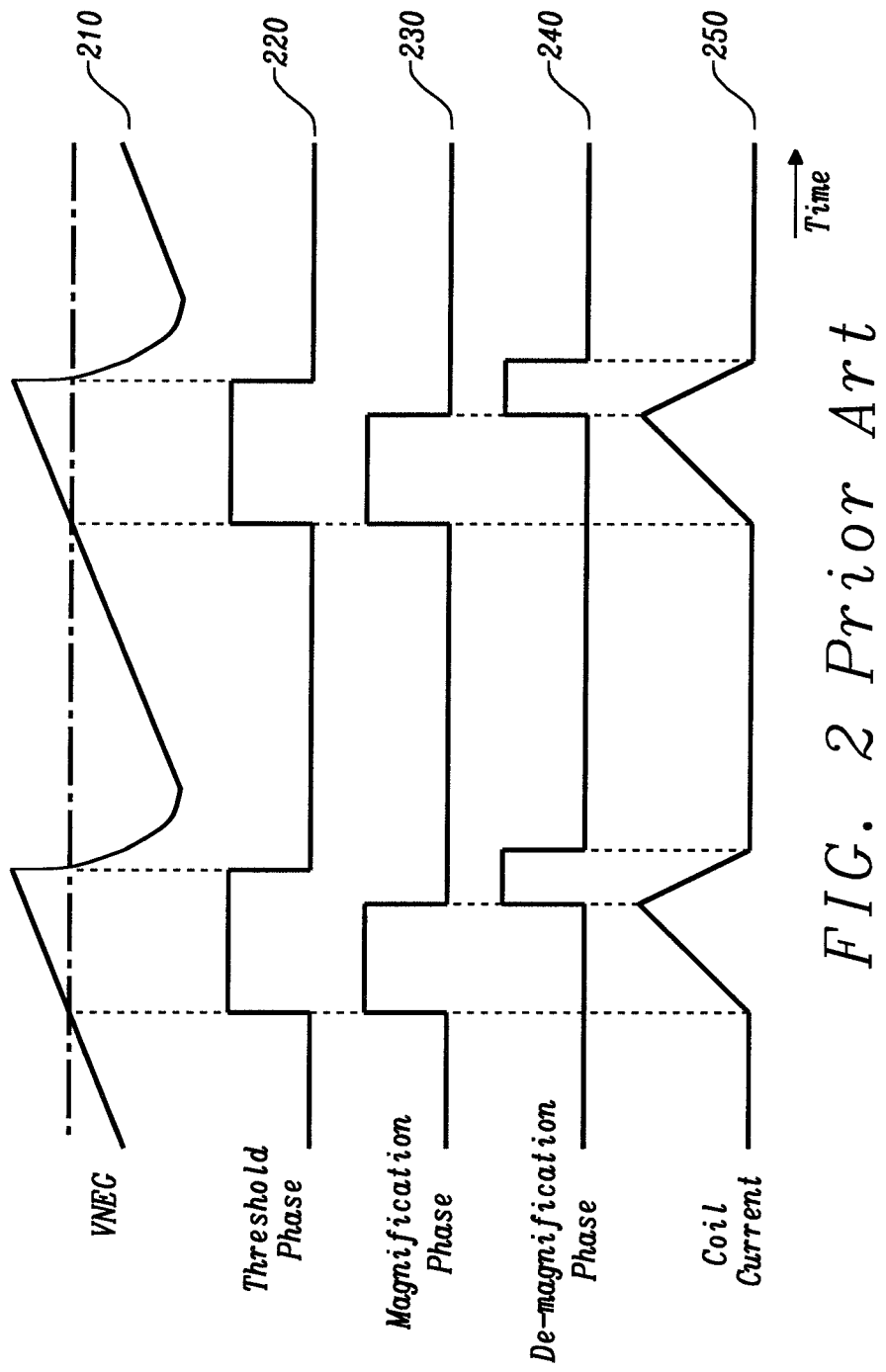

FIG. 2 schematically illustrates an example of control signal waveforms of the conventional SIMO regulator of FIG. 1. In particular, curve 230 shows an example of the control signal of the first operation phase (magnetization phase). As illustrated above, both the high side switching device 110 and the boost low side switching device 180 are switched to the ON state, where the coil of the inductive element 130 is being magnetized. Curve 240 shows an example of the control signal of the second operation phase (de-magnetization phase), where both the low side switching device 120 and the boost low side switching device 180 are switched to the ON state. In this phase, the coil of the inductive element 130 is being de-magnetized. Curve 250 shows an example of the coil current of during the first and second operation phases (i.e., the magnetization and de-magnetization phases). Curve 210 shows an example of the negative output voltage VNEG and curve 220 indicates the periods when the negative output voltage is above a predetermined voltage level. The over voltage (or under voltage if the absolute value of the negative voltage is considered) events shown in curve 220 may also be seen as triggers for the magnetization phase shown in curve 230.

Figure 3:
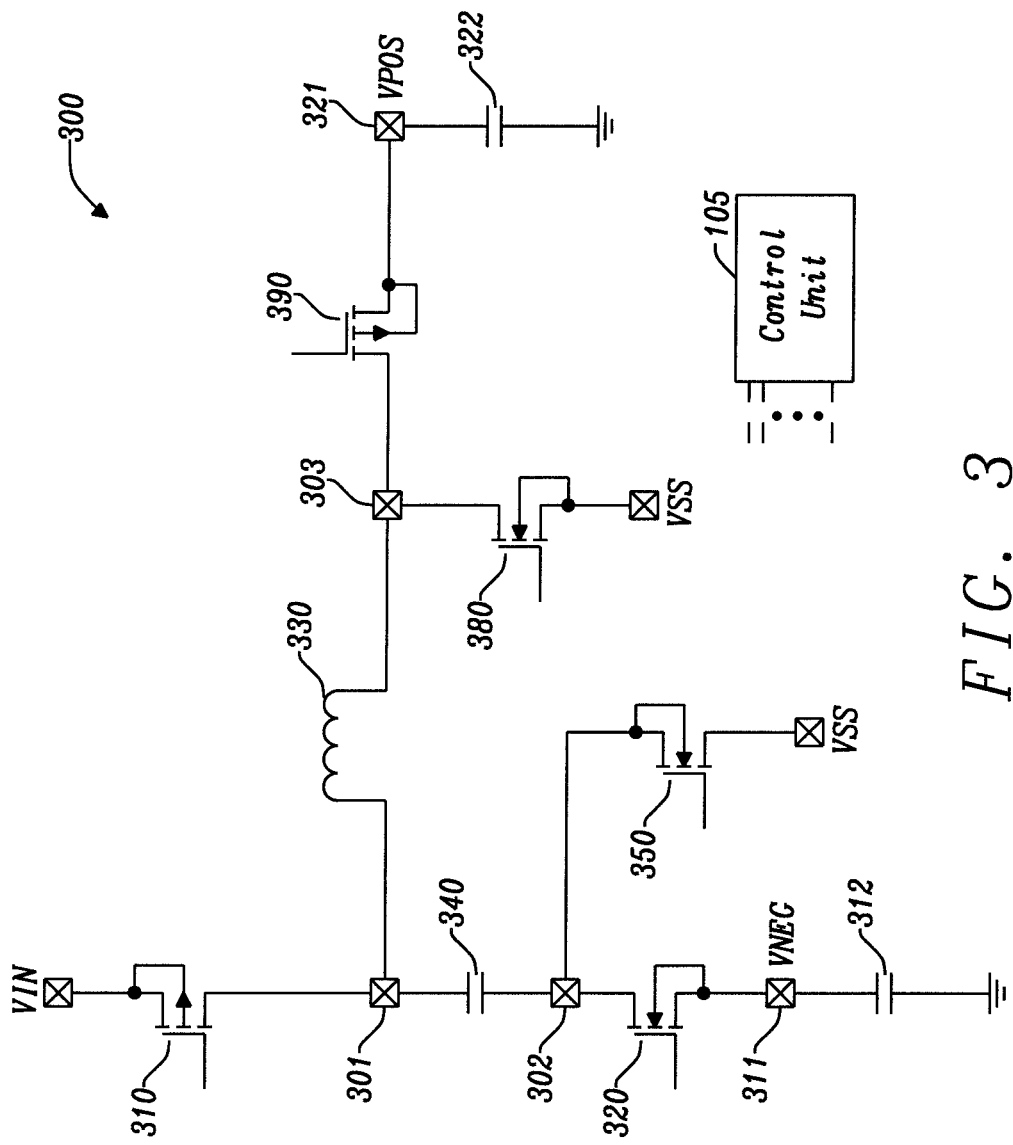

FIG. 3 schematically illustrates an example of a DC-DC voltage regulator 300 with one negative output rail and one positive output rail according to embodiments of the disclosure. Identical or like reference numbers in FIG. 3 indicate identical or like elements in the convention SIMO regulator shown in FIG. 1, and repeated description thereof may be omitted for reasons of conciseness. In addition to the elements of the conventional SIDO regulator of FIG. 1, a capacitive element (e.g., a flying capacitor) 340 and a charging switching device 350 are provided, in order to reduce the voltage drop on the coil of the inductive element 330 and the low side switching device 320. In particular, the capacitive element 340 and the charging switching element 350 are coupled in series between a first intermediate node 301 and the predetermined voltage level (e.g., VSS). The first intermediate node 301 is arranged between a high side switching device 310 and the inductive element (e.g., an inductor) 330, similar to the first intermediate node 101 as shown in FIG. 1. Further, the voltage regulator 300 also comprises a boost high side switching device 390, a second intermediate node 303, an (negative) output node (port) 311 and a (positive) output node 321. The voltage regulator 300 also comprises capacitors 312 and 322 coupled between the respective output ports 311, 321 and ground.

Figure 4:
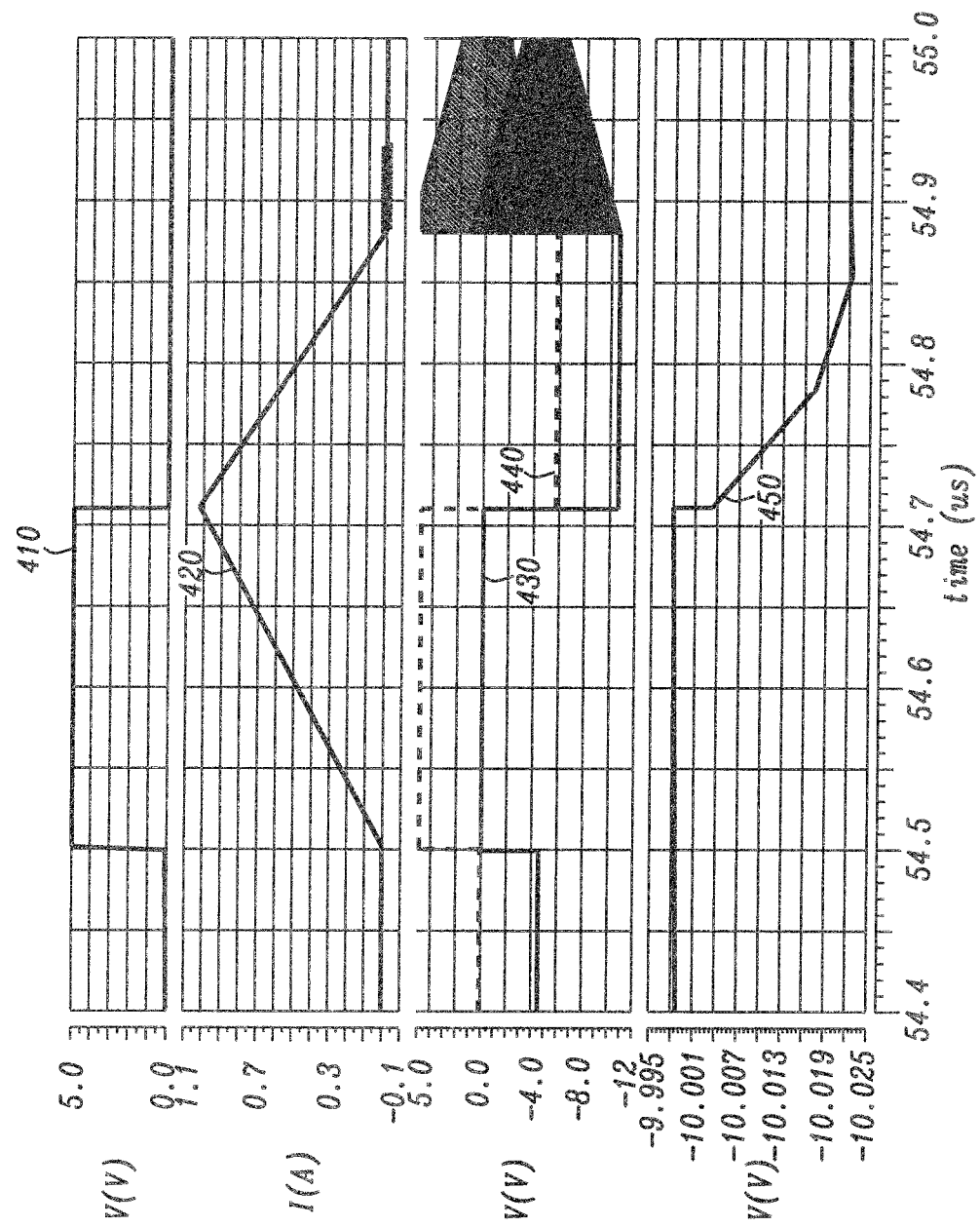

For better understanding of the operation phases of the proposed SIDO regulator 300, reference is made also to the simulation results as shown in FIG. 4. In this example, it is assumed that VIN=5V, VNEG=−10V and L=0.47 pH.

In a first operation phase (magnetization phase, between 54.5 μs and 54.7 μs as shown in curve 410 of FIG. 4), the high side switching device 310, the boost low side switching device 380, and the charging switching device 350 are all switched to the ON state. In this phase, the inductor current is increasing as shown in curve 420. At the same time, the capacitive element (the flying capacitor) 340 is being charged to VIN through the charging switching device 350. Curve 430 shows the voltage level at the first intermediate node 301 which is coupled to one port of the capacitor element 340 and curve 440 shows the voltage level at the second intermediate node 302 which is coupled to the other port of the capacitor element 340. Notably, during this period, the low side switching device 320 sees a $V_{DS}$ (drain-to-source voltage) equals to |VNEG| between the drain (coupled to the second intermediate node 302) and the source (coupled to the output node at VNEG). Consequently, there is a $\Delta V_{DS}$ improvement of around VIN, compared to the $V_{DS}$ value of VIN+|VNEG| in the conventional SIDO regulator shown in FIG. 1.

In a second operation phase (de-magnetization phase, between 54.7 μs and 54.9 μs as shown in FIG. 4), the low side switching device 320 and the boost low side switching device 380 are switched to the ON state while the other switching devices are switched to the OFF state. In this case, due to the flying capacitor 340, the voltage at the first intermediate node 301 is at −5V. Thus, the voltage drop on the inductor 330 is |VNEG|−VIN. Consequently, in the present example, the time duration that the inductor current is supplying negative current is increased by a factor of two. The resulting VNEG is shown in curve 450 of FIG. 4.

By reducing the voltage drop on the low side switching device 320 of the negative rail, the DC-DC voltage regulator 300 enables the possibility to extend the output voltage range to values that are typically beyond process limitations. Further, compared to the conventional SIMO regulator 100 as shown in FIG. 1, the regulator 300 of FIG. 3 also enables the uses of a coil with smaller size. For instance, if the output voltage VNEG equals twice the input voltage VIN (i.e., VNEG=−2×VIN), a coil with half the size (compared to the classic non-hybrid arrangement) can be used since the voltage drop across the inductor is halved.

Additionally, it is also noted that the voltage difference between the first and second intermediate nodes 301, 302 is always approximately equal to VIN, which basically means that the capacitor 340 does not see high voltage differences. Thus the derating at the capacitor is minimum, which in turn allows for the use of capacitors with smaller size.

Figure 5:
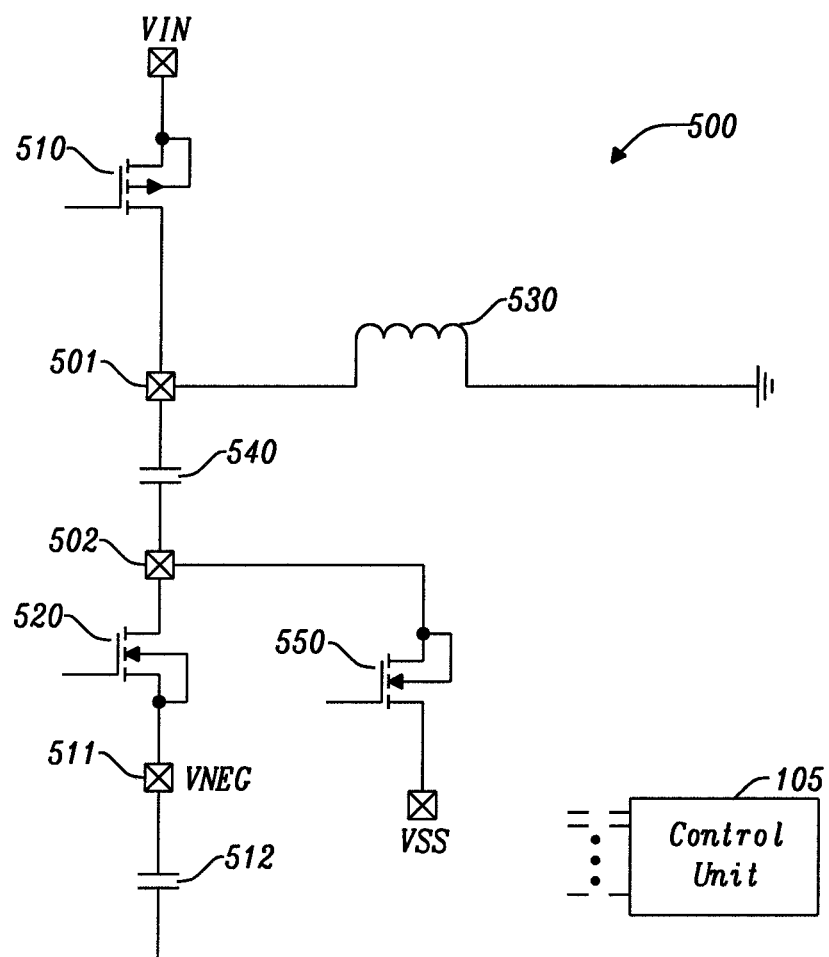

Although the topology shown in FIG. 3 relates to a SIDO regulator, the same concept can be applied in any context that involves negative output regulation that combines the need of a small coil and high efficiency performance. In particular, the present disclosure can be embodied as a DC-DC voltage regulator 500 with (only) one single negative output rail as shown in FIG. 5. The voltage regulator 500 is essentially the same as the SIDO regulator 300 of FIG. 3, expect for that one port of the inductive element 530 which was coupled to the positive output rail in FIG. 3 is now (directly) coupled to ground. Consequently, analogous or similar operation phases for generating the negative output voltage VNEG illustrated above for the SIDO regulator 300 of FIG. 3 also apply here. Further, the voltage regulator 500 also comprises a high side switching device 510, a low side switching device 520, a charging switching device 550, a first intermediate node 501, a second intermediate node 502, an (negative) output node (port) 511 and a capacitor 512 coupled between the output port 511 and ground.

This kind of signal output generation may be beneficial for instance for the cases of OLED drivers, which may need two separate high current inductive converters in order to generate a positive and a negative output rail individually for the display. In these cases, the negative voltage can be as low as −9V for a load of approximately 1 A. In order to support this high power application (especially in a portable device like a smartphone), either a big sized coil or multiple phases with smaller coils would be needed. This is because the maximum voltage/power that can be negatively boosted is dependent on the maximum current to be delivered and on the series resistance in the power path. So, reducing the effective voltage by a factor VIN to be boosted positively impacts the design of the power converter and relaxes design constraints on the coil. That is to say, in the example of a signal negative output rail (e.g., for OLED drivers), this can be translated into the use of a single phase instead of two or more, or in the use of a smaller sized coil.

Figure 6:
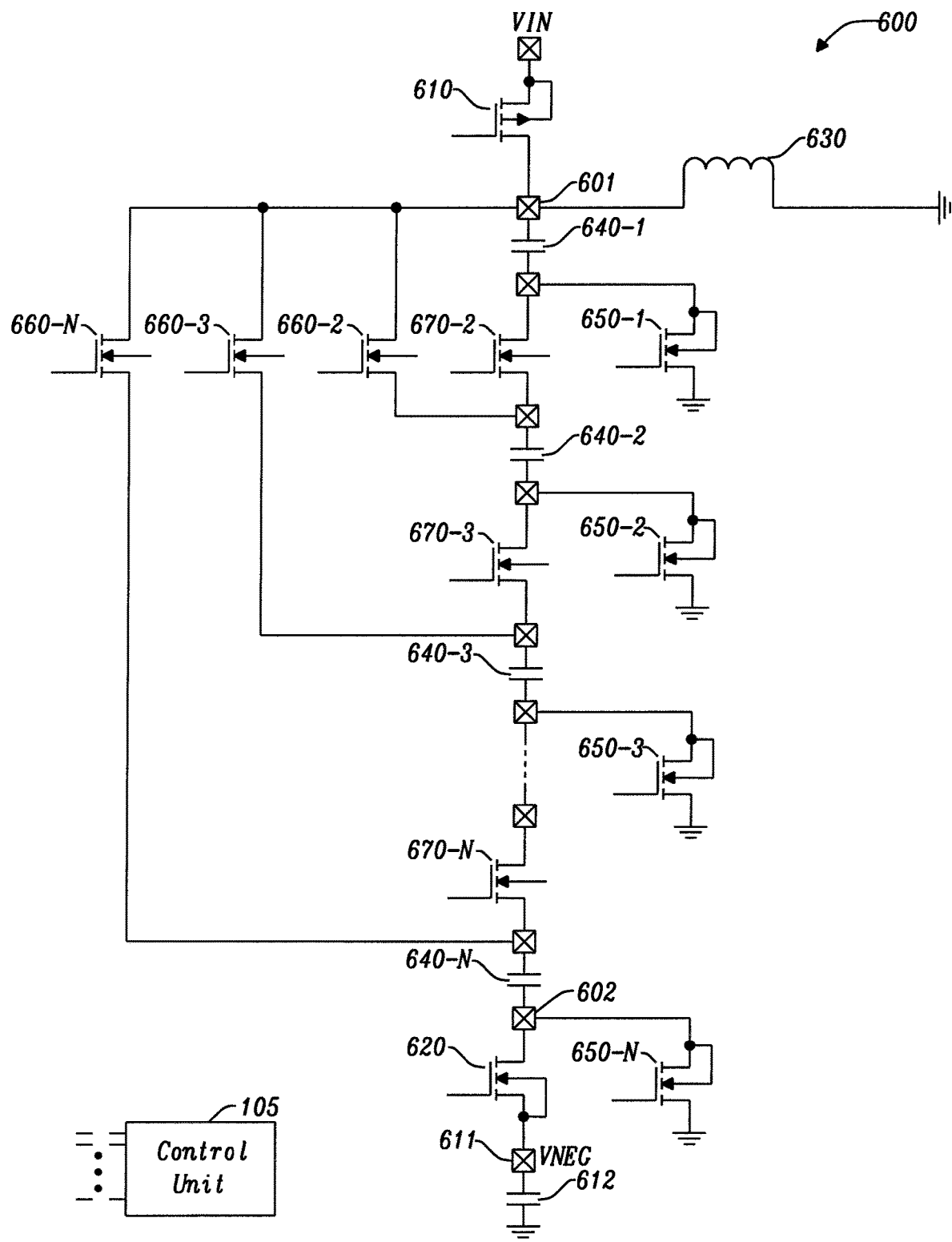

Moreover, the present disclosure is not limited to circuits with one single flying capacitor (e.g., capacitive element 540 of FIG. 5). Multiple (flying) capacitors can be used, in order to (further) reduce the voltage over the coil during the de-magnetization phase. FIG. 6 schematically illustrates an example of such extension of the DC-DC voltage regulator of FIG. 5 to multiple stages. The voltage regulator 600 comprises a low side switching device 620, an (negative) output node (port) 611 and a capacitor 612 coupled between the output port 611 and ground. The voltage regulator 600 also comprises charging switching devices 650-1 to 650-N and bypass switching devices 660-2 to 660-N.

In particular, in addition to the capacitive element 640-1 which is coupled between the first intermediate node 601 and the second intermediate node 602, a number of N−1 further capacitive elements (e.g., flying capacitors) 640-2 to 640-N are provided between the first intermediate node 601 and the second intermediate node 602. A respective intermediate switching device (e.g., intermediate switching device 670-3) is provided for coupling the respective further capacitive element (e.g., capacitive element 640-3) in series to the preceding capacitive element (e.g., capacitive element 640-2). In other words, the intermediate switching devices 670-2 to 670-N and the capacitive elements 640-1 to 640-N are alternatingly coupled in series between the first intermediate node 601 and the second intermediate node 602. Also, a respective bypass switching device (e.g., bypass switching device 660-3) is provided for switchably coupling the respective further capacitive element (e.g., capacitive element 640-3) (directly) to the first intermediate node 601. Of course, a respective charging switching device (e.g., charging switching device 650-3) is also provided for charging the capacitive element (e.g., capacitive element 640-3) to VIN during the magnetization phase (i.e., the first operation phase) through the high side switching device 610 and the respective bypass switching device (e.g., bypass switching device 660-3).

The introduction of multiple flying capacitors 640-1 to 640-N allows to further reduce the voltage drop over the coil of the inductive element 630 during the de-magnetization phase, by a quantity of N×VIN. However, this may come at the expense of additional switches in the circuit and additional pins.

Figure 7:
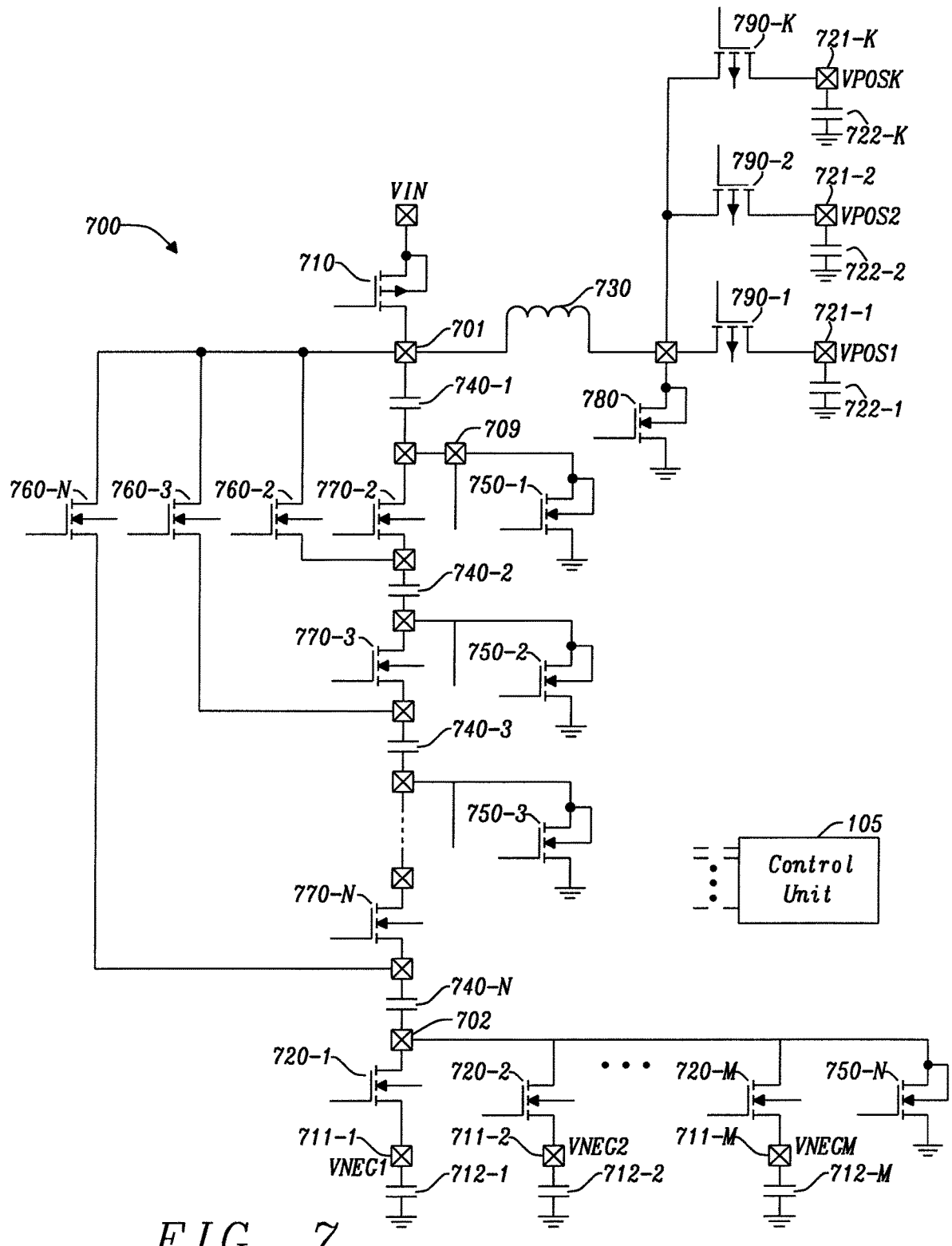

More in general, the architecture of FIG. 6 can be seen as a subset of a further extended SIMO topology, where on top of a single negative rail also one or more negative and positive rails are generated by using the same single coil (same inductive element), as shown in FIG. 7.

The voltage regulator 700 comprises a high side switching device 710, low side switching devices 720-1 to 720-M, (negative) output nodes (ports) 711-1 to 711-M and capacitors 712-1 to 712-M coupled between the respective output ports 711-1 to 711-M and ground. The voltage regulator 700 also comprises charging switching devices 750-1 to 750-N, bypass switching devices 760-2 to 760-N and intermediate switching devices 770-2 to 770-N. The voltage regulator 700 further comprises a first intermediate node 701, a second intermediate node 702, a boost low side switching device 780, an inductive element 730, boost high side switching devices 790-1 to 790-K, (positive) output nodes (ports) 721-1 to 721-K and capacitors 722-1 to 712-K coupled between the respective output ports 721-1 to 721-K and ground. As shown in the SIMO topology of FIG. 7, there are up to K positive output rails and up to M negative output rails that can be either connected to the capacitive element 740-N or to any of the capacitive element 740-1, 740-2, . . . , 740-(N−1), thereby forming a complex multi-dimensional matrix. That is to say, by tapping one port of a particular capacitive element (e.g., an intermediated node 709 at one port of the capacitive element 740-1), a corresponding intermediate negative voltage can be provided as a voltage output.

Figure 8:
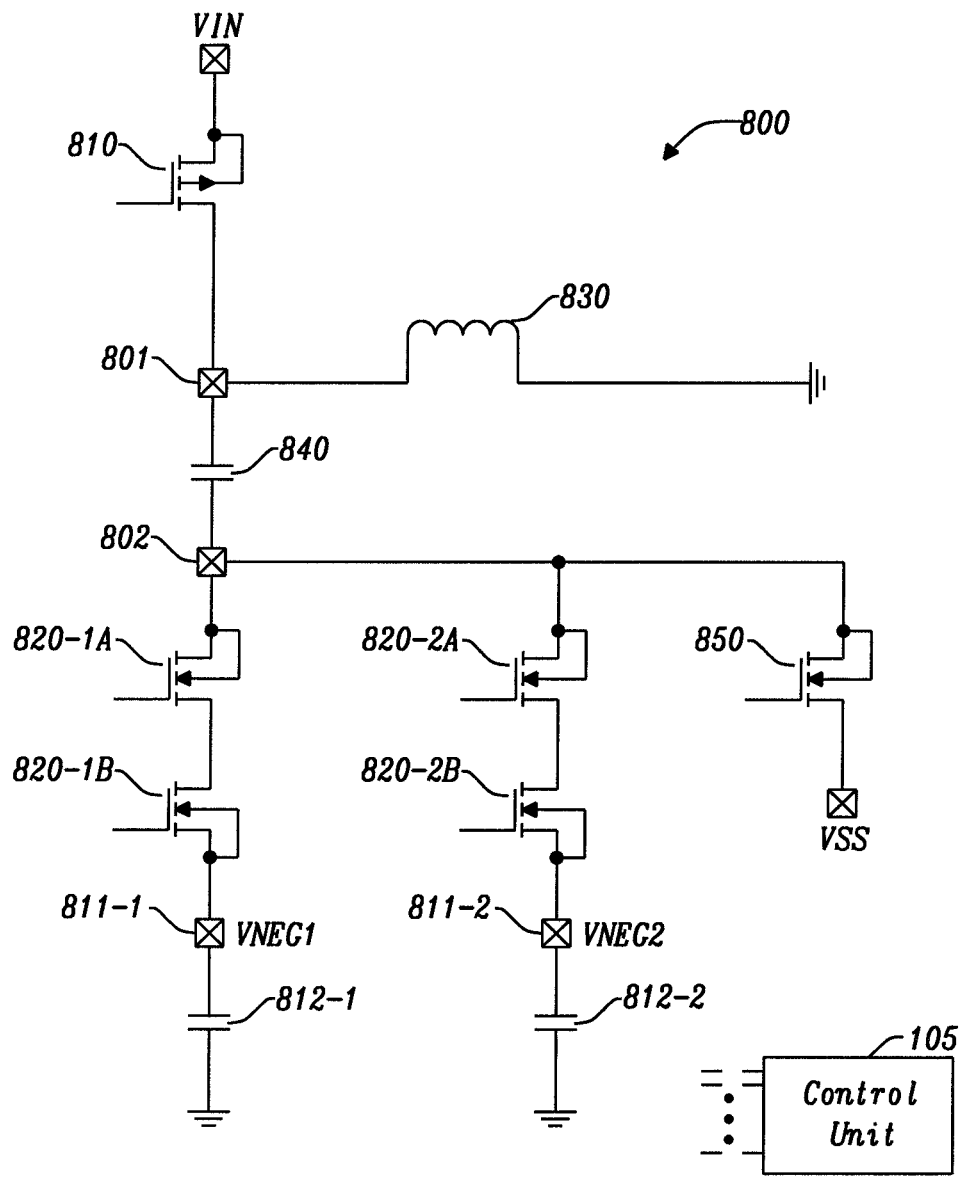

FIG. 8 schematically illustrates an example of an extension of the DC-DC voltage regulator of FIG. 5 to multiple negative output rails. Such extension may have many practical uses. In the present example as shown in FIG. 8, where only two outputs are considered for simplicity, the same combination of an inductor 830 and a capacitor 840 serves two independently regulated negative outputs (i.e., VNEG1 and VNEG2). Notably, the target voltage level for VNEG1 and VNEG2 can be different from each other, hence the low side switches (i.e., low side switching devices 820-1A, 820-1B and 820-2A, 820-2B) are built as a series of two devices respectively to block the cross conduction between the two output rails. That is, the low side switching device 820-1 is formed by two switching devices (e.g., MOSFETs) 820-1A and 820-1B coupled in series in a back-to-back configuration. The voltage regulator 800 also comprises a second intermediate node 802, (negative) output nodes (ports) 811-1 to 811-2 and capacitors 812-1 to 822 coupled between the respective output ports 811-1 to 811-2 and ground.

During operation, when the coil (of the inductive element 830) serves the output VNEG1, the voltage at the first intermediate node 801 (coupled to one port of the capacitive element) is switched between VIN and −VNEG1+VIN. When the coil serves the output VNEG2, the voltage at the first intermediate node 801 (coupled to one port of the capacitive element) is switched between VIN and −VNEG2+VIN.

Figure 9:
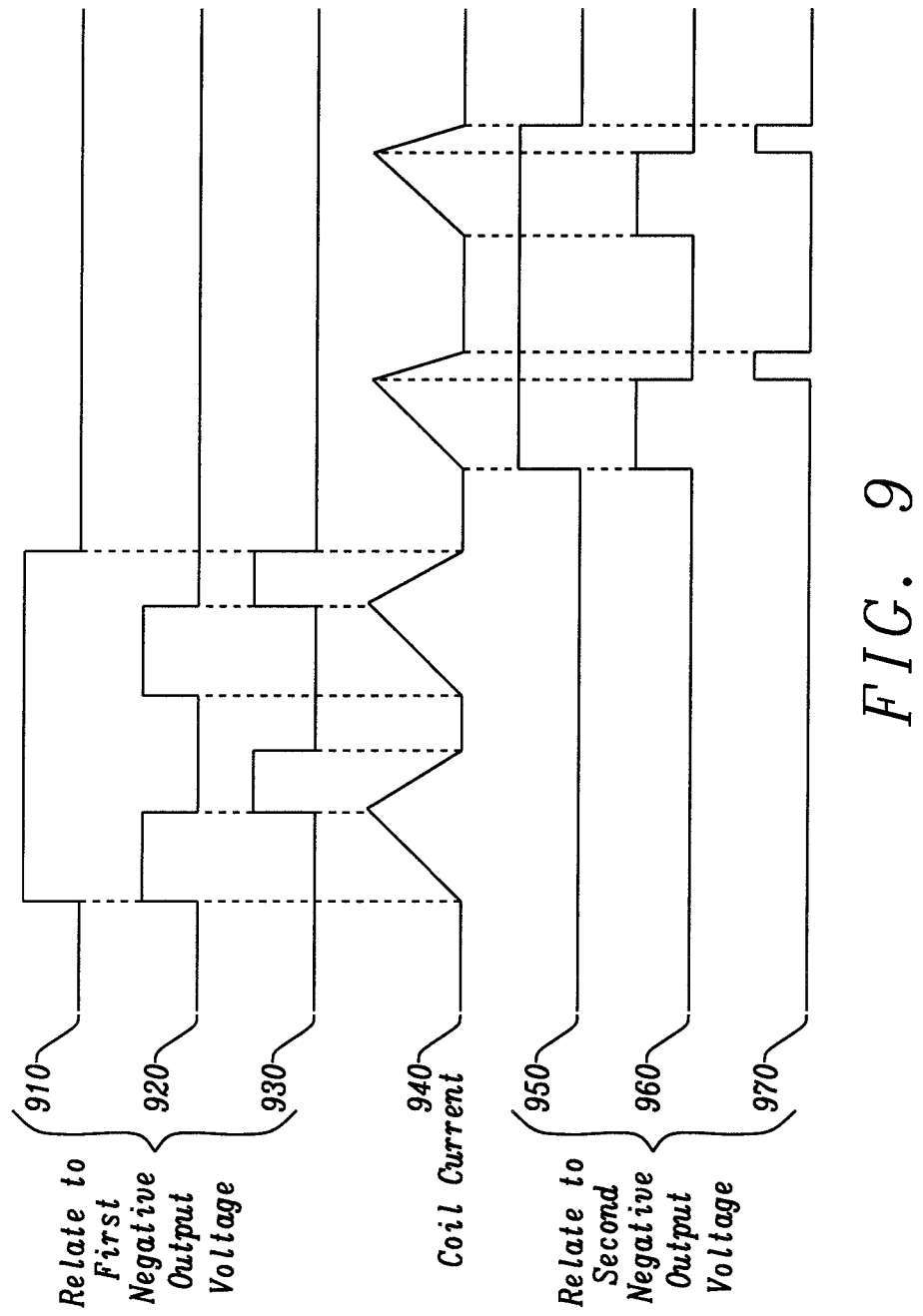

FIG. 9 schematically illustrates an example of signal waveforms of the DC-DC voltage regulator of FIG. 8. In the present example, it is assumed that |VNEG2| is larger than |VNEG1|. As shown in FIG. 9, curves 910-930 relate to the (first) negative output voltage VNEG1 and curves 950-970 relate to the second negative output voltage VNEG2. More specifically, curves 920 and 960 show the respective magnetization phases (i.e., the high side switching device 810 and the charging switching device 850 are ON), while curves 930 and 970 show the respective de-magnetization phases (the respective low side switching devices 820-1, 820-2 and the charging switching device 850 are ON). Correspondingly, curves 910 and 950 show respective negative voltages VNEG1 and VNEG2 (that are below respective predetermined voltage levels). Similar to curve 220 of FIG. 2, the over voltage (or under voltage if the absolute value of the negative voltage is considered) events in curves 910 and 950 may be seen as triggers for the respective magnetization phases of curves 920 and 960. Curve 940 shows the current at the coil of the inductive element 830. Since it is assumed that |VNEG2| is larger than |VNEG1|, it can be seen from curves 930 and 970 that the duration of the de-magnetization phase of low side switching devices 820-2 (for VNEG2) is shorter than that of low side switching devices 820-1 (for VNEG1).

Figure 10:
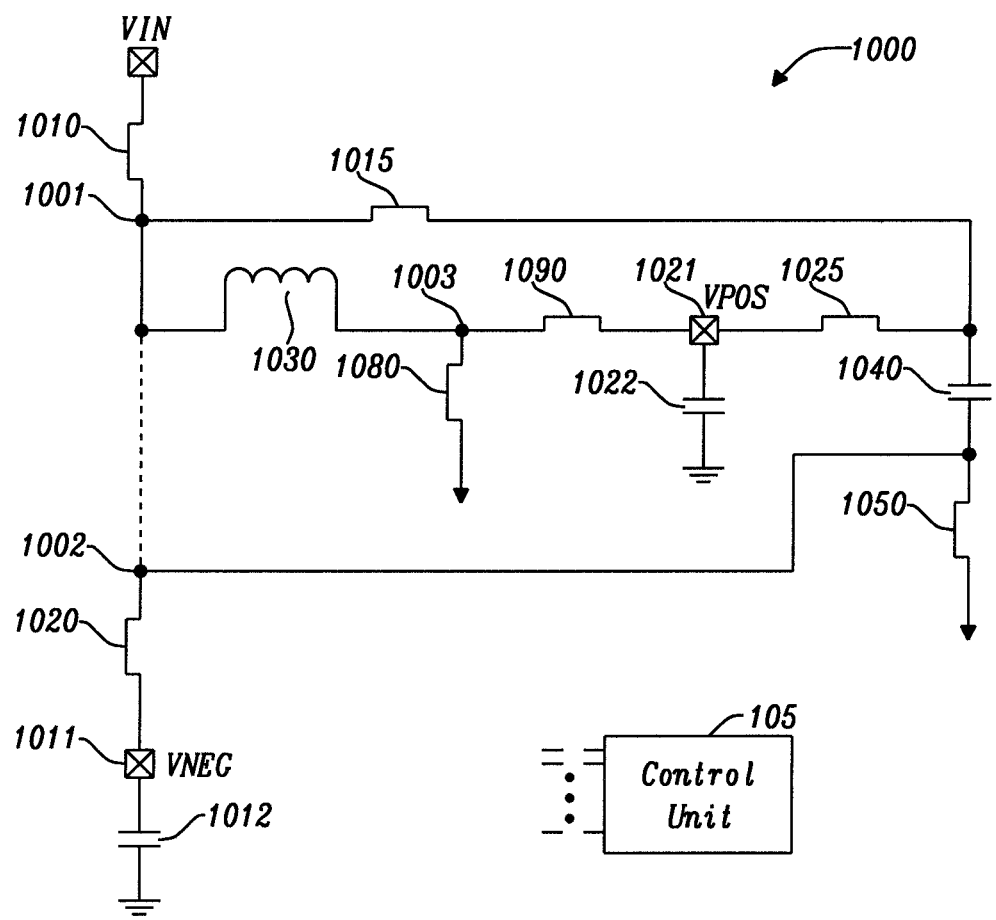

FIG. 10 schematically illustrates a further embodiment of a DC-DC voltage regulator 1000 with one negative output rail and one positive output rail (SIDO). In general, this topology takes advantage of the positive output voltage VPOS to reduce the ripple on the coil of the inductive element 1030. For being able to correctly charge the capacitive element (flying capacitor) 1040, VPOS is generally assumed to be smaller than |VNEG|.

As shown in FIG. 10, the SIDO regulator 1000 comprises a high side switching device 1010 coupled between the input port VIN and a first intermediate node 1001. A first switching device 1015, the capacitive element (e.g., lying capacitor) 1040 and a charging switching device 1050 are coupled in series between the first intermediate node 1001 and a first predetermined voltage level (e.g., VSS). The inductive element 1030 and a boost low side switching device 1080 are coupled in series between the first intermediate node 1001 and the first predetermined voltage level (e.g., VSS). Further, the regulator 1000 also comprises a negative output rail coupled between a first (negative) output port 1011 and a second intermediate node 1002 that is arranged between one port of the capacitive element 1040 and the charging switching device 1050. The negative output rail comprises a low side switching device 1020 and generates a negative output voltage VNEG at the output port 1011. The regulator 1000 further comprises a positive output rail coupled between a second (positive) output port 1021 and a third intermediate node 1003 arranged between the inductive element 1030 and the boost low side switching device 1080. The positive output rail comprises a boost high side switching device 1090 and generates a positive output voltage VPOS at the output port 1021. A second switching device 1025 is coupled between the positive output port VPOS and the capacitive element 1040. Further, the voltage regulator 1000 also comprises capacitors 1012 and 1022, coupled between the respective output ports 1011, 1021 and ground.

During operation of the SIDO regulator 1000, the capacitive element 1040 is charged to VPOS, instead of VIN as defined in FIG. 3 or FIG. 5). Since the (positive) output voltage VPOS is typically higher than the input voltage VIN, a higher ΔV is utilized, thus better system performance can be achieved.

Referring to the topology as shown in FIG. 3, it is noted that the regulator 300 of FIG. 3 can be seen as a subset of the regulator 1000 of FIG. 10, if the first switching device 1015 is always ON and the second switching device 1025 is always OFF.

Figure 11:
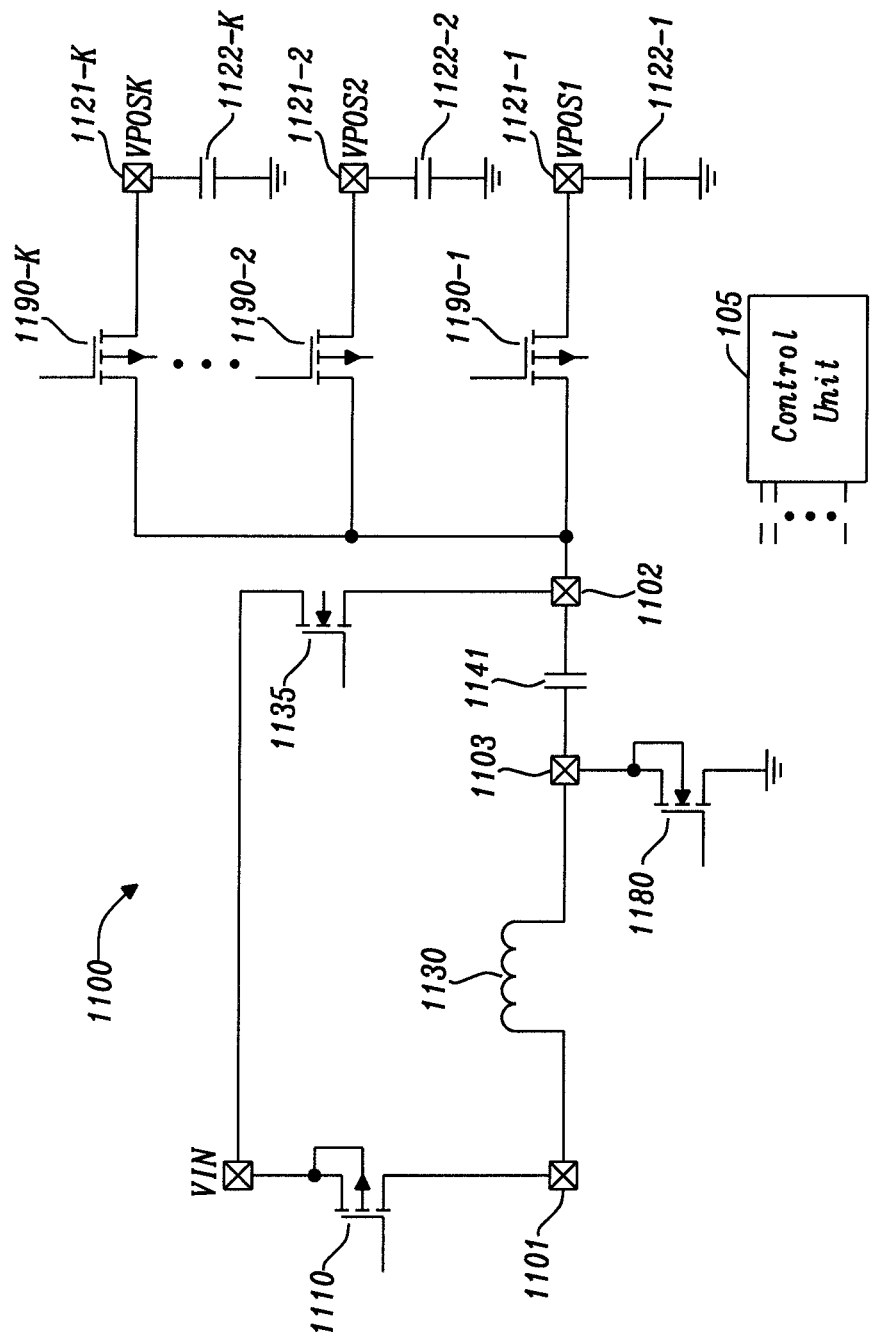

FIG. 11 schematically illustrates another embodiment of a DC-DC voltage regulator 1100 with multiple positive output rails. In particular, it is noted that the regulator 1100 of FIG. 11 can be considered as a dual of the regulator 800 of FIG. 8 (which comprises multiple negative output rails). That is to say, instead of being used for generating the negative output voltage(s) as shown in FIG. 8 (or FIG. 5), the capacitive element 1141 and the charging switching device 1150 are provided to efficiently generate the positive voltages with improved system performance. The voltage regulator 1100 also comprises a high side switching device 1110, a first intermediate node 1101, a second intermediate node 1102, a third intermediate node 1003, boost high side switching devices 1190-1 to 1190-K, (positive) output nodes (ports) 1121-1 to 1121-K and capacitors 1122-1 to 1112-K coupled between the respective output ports 1121-1 to 1121-K and ground.

Correspondingly, the operation phases are also similar. In particular, during a first operation phase (the magnetization phase of the inductive element 1130), the capacitive element 1141 is first charged to VIN through a switching device 1135 and a charging switching device 1180. Subsequently, during the second operation phase (the de-magnetization phase of the inductive element 1130), the capacitive element 1141 is coupled in series to VIN, the coil (i.e., the inductive element) and a selected output voltage VPOSk through a respective boost high side switching device 1190-k. Compared to the conventional SIMO regulator, this embodiment requires only an additional capacitive element 1141 and a switching device 1135.

Figure 12:
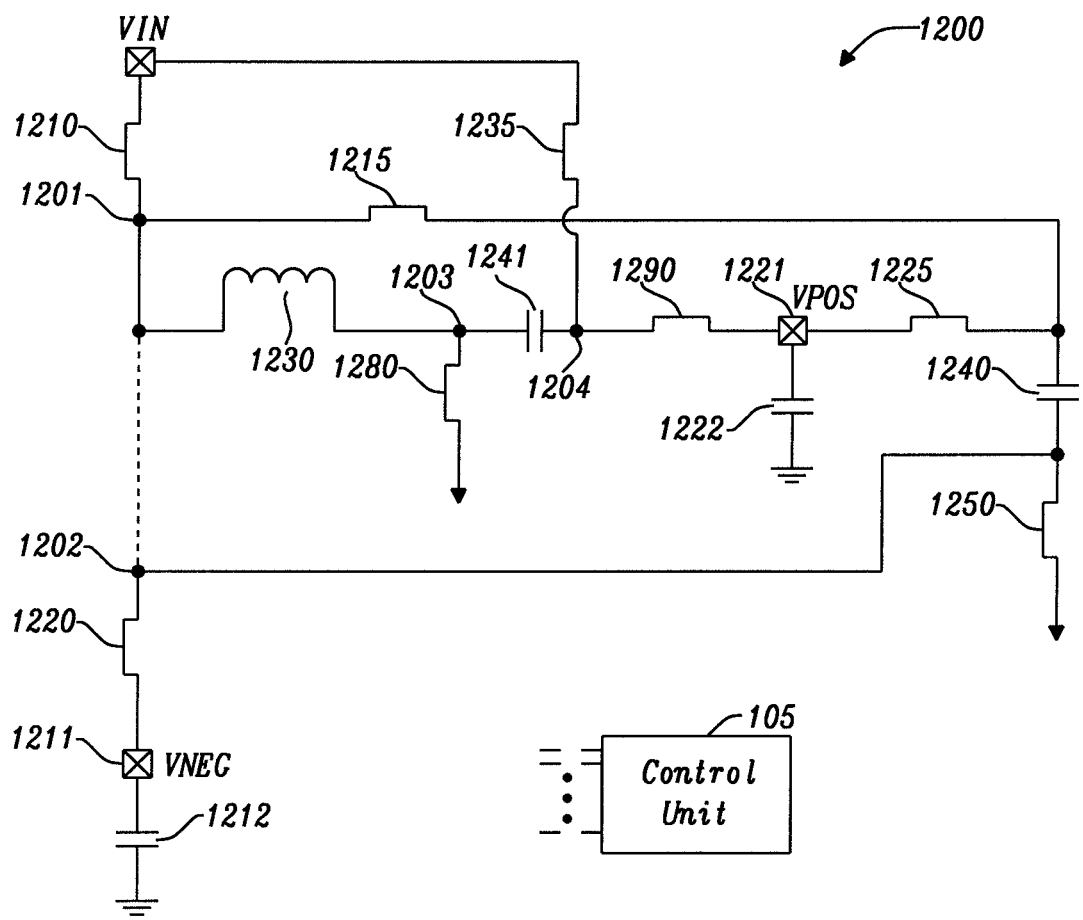

FIG. 12 schematically illustrates yet another example of a DC-DC voltage regulator 1200 with one negative output rail and one positive output rail (SIDO). Notably, this example can be seen as a combination of the regulator 1000 of FIG. 10 and the regulator 1100 of FIG. 11. By such combination (of multiple flying capacitors 1240 and 1241), performance for generating both the positive output voltage and the negative output voltage can be improved. In particular, the voltage regulator 1200 comprises switching devices 1210, 1220, 1250, 1280, 1290, 1215, 1225 and 1235, intermediate nodes 1201, 1202, 1203 and 1204, an inductive element 1230, output nodes 1211 and 1221, and capacitors 1212 and 1222.

Figure 13:
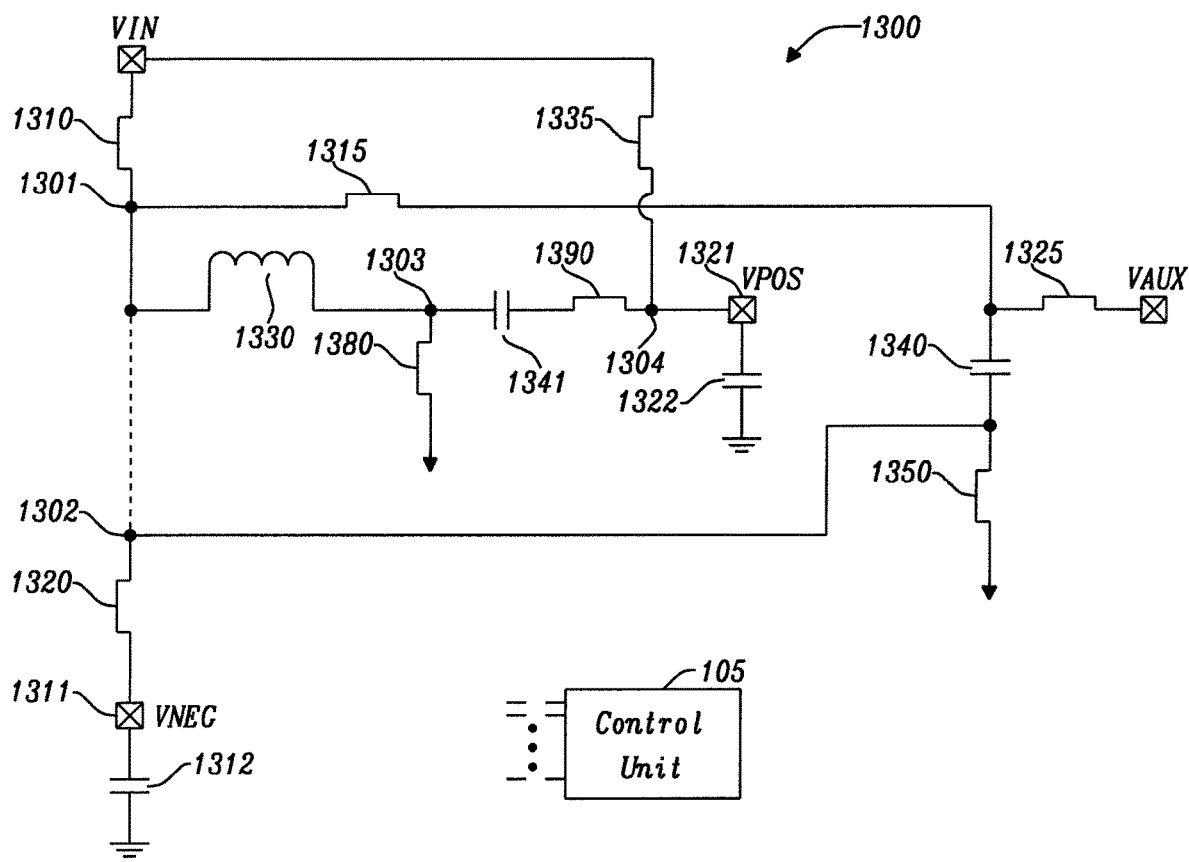

FIG. 13 schematically illustrates yet another example of a DC-DC voltage regulator 1300 with one negative output rail and one positive output rail (SIDO). Similar concept of the SIDO voltage regulator 1200 as shown in FIG. 12 is used here. In particular, the voltage regulator 1300 comprises switching devices 1310, 1320, 1350, 1380, 1390, 1315, 1325 and 1335, intermediate nodes 1301, 1302, 1303 and 1304, an inductive element 1330, output nodes 1311 and 1321, and capacitors 1341, 1312 and 1322. The major difference (compared to the SIDO voltage regulator 1200 of FIG. 12) is that the capacitive element 1340 for generating the negative output voltage is now coupled to an external (auxiliary) voltage level VAUX through a switching device 1325, instead of being coupled to the positive output voltage VPOS through the switching device 1225 as shown in FIG. 12. By using an auxiliary voltage VAUX, the capacitive element 1340 can be charged to VAUX (instead of VPOS) during the magnetization phase. Assuming that VAUX is larger than VIN, then a higher ΔV can be achieved when charging the capacitive element 1340 which eventually means that better system performance can be achieved, compared to the SIDO voltage regulator 500 as shown in FIG. 5. In particular, it is noted that the auxiliary voltage level is lower than the absolute value of the maximum negative output voltage that needs to be generated.

It should be noted that the topology of regulator 1000, 1200 or 1300 can be easily extended to multiple stages and multiple dimensions (e.g., multiple positive output rails and/or multiple negative output rails) as shown in FIG. 7. In particular, the dashed lines shown in the regulators 1000, 1200 and 1300 refer to the possible multi-stage extension as shown in FIG. 6 (or FIG. 7).

Figure 14:
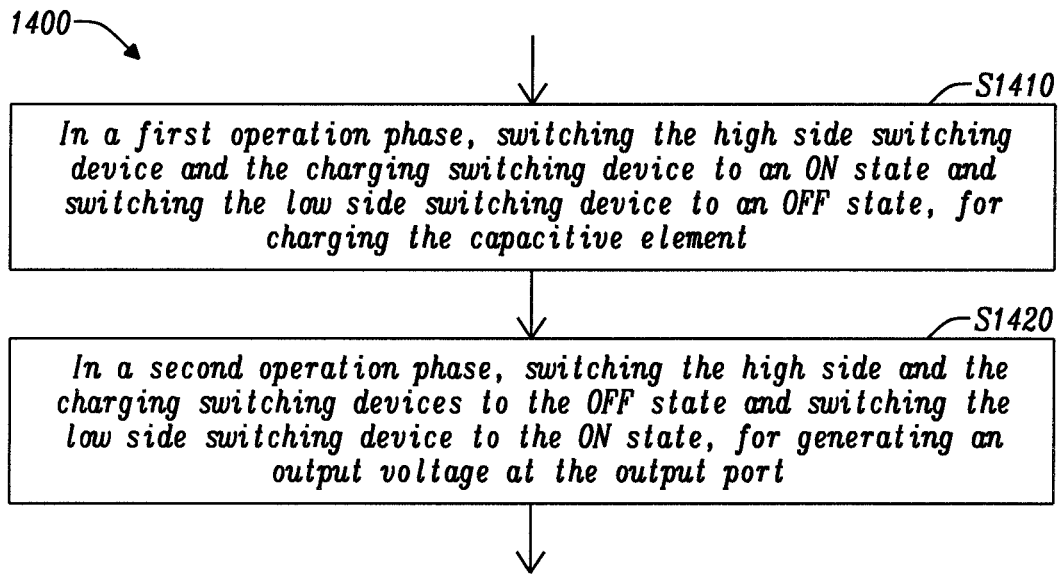
FIG. 14 is a flowchart schematically illustrating a method of operating a DC-DC voltage regulator according to embodiments of the disclosure.

FIG. 14 is a flowchart schematically illustrating a method 1400 of operating a DC-DC voltage regulator. The circuit topology may correspond to the voltage regulator 500 as shown in FIG. 5. The method 1400 comprises, at step S1410, in a first operation phase, switching the high side switching device and the charging switching device to an ON state (conducting state) and switching the low side switching device to an OFF state (non-conducting state), for charging the capacitive element. The method 1400 further comprises, at step S1420, in a second operation phase, switching the high side and the charging switching devices to the OFF state and switching the low side switching device to the ON state, for generating an output voltage at the output port.

Figure 15:
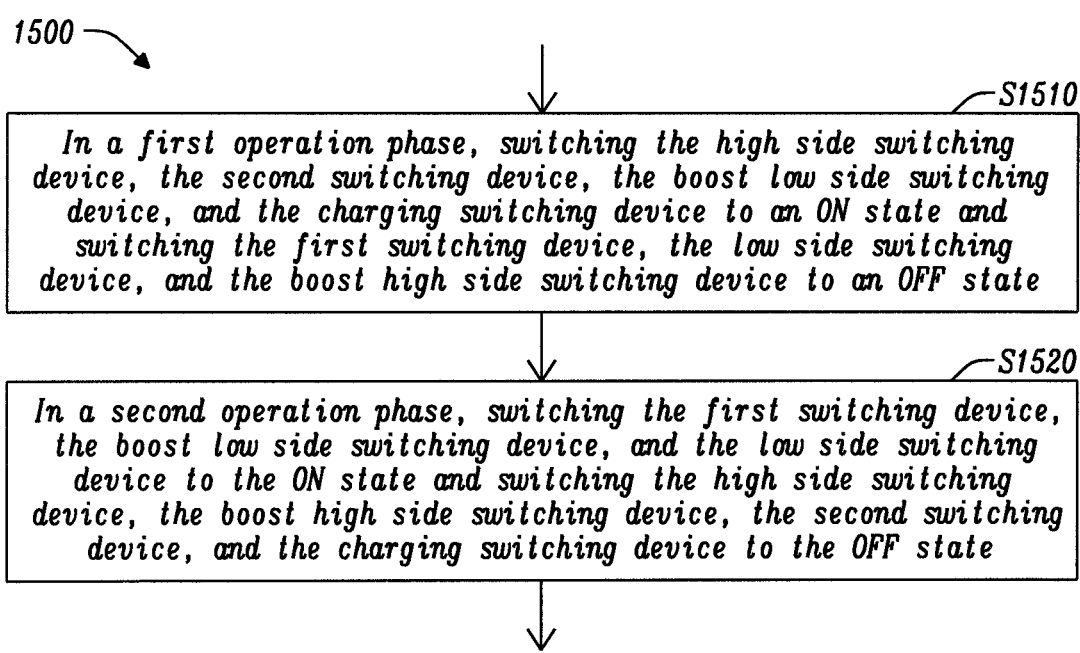
FIG. 15 is a flowchart schematically illustrating another method of operating a DC-DC voltage regulator according to embodiments of the disclosure.

FIG. 15 is a flowchart schematically illustrating another method 1500 of operating a DC-DC voltage regulator. The circuit topology may correspond to the voltage regulator 1000 as shown in FIG. 10. The method 1500 comprises, at step S1510, in a first operation phase, switching the high side switching device, the second switching device, the boost low side switching device, and the charging switching device to an ON state and switching the first switching device, the low side switching device, and the boost high side switching device to an OFF state, for charging the capacitive element. The method 1500 further comprises, at step S1520, in a second operation phase, switching the first switching device, the boost low side switching device, and the low side switching device to the ON state and switching the high side switching device, the boost high side switching device, the second switching device, and the charging switching device to the OFF state.

Figure 16:
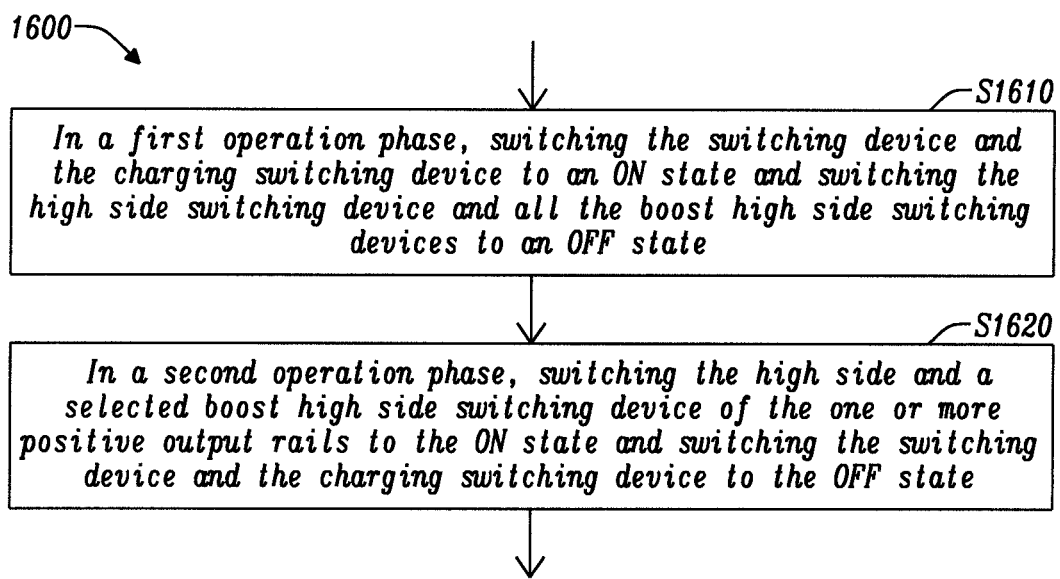
FIG. 16 is a flowchart schematically illustrating another method of operating a DC-DC voltage regulator according to embodiments of the disclosure.

FIG. 16 is a flowchart schematically illustrating another method 1600 of operating a DC-DC voltage regulator. The circuit topology may correspond to the voltage regulator 1100 as shown in FIG. 11. The method 1600 comprises, at step S1610, in a first operation phase, switching the switching device and the charging switching device to an ON state and switching the high side switching device and all the boost high side switching devices to an OFF state, for charging the capacitive element. The method 1600 further comprises, at step S1620, in a second operation phase, switching the high side and a selected boost high side switching device of the one or more positive output rails to the ON state and switching the switching device and the charging switching device to the OFF state, for generating the output voltage at the respective selected output port.

It should be noted that the apparatus features described above correspond to respective method features that may however not be explicitly described, for reasons of conciseness. The disclosure of the present document is considered to extend also to such method features. In particular, the present disclosure is understood to relate to methods of operating the circuits described above, and/or to providing and/or arranging respective elements of theses circuits.

It should further be noted that the description and drawings merely illustrate the principles of the proposed circuits and methods. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method. Furthermore, all statements herein providing principles, aspects, and embodiments of the invention, as well as specific examples thereof, are intended to encompass equivalents thereof.

What is claimed is:

1. A DC-DC voltage regulator for converting an input voltage at an input port into one or more output voltages at respective output ports, the voltage regulator comprising:
   a high side switching device coupled between the input port and a first intermediate node,
   an inductive element having one port coupled to the first intermediate node,
   a capacitive element having two ports, coupled between the first intermediate node and a second intermediate node, with its one port coupled to the first intermediate node,
   a negative output rail coupled between the second intermediate node and one of the output ports, wherein the negative output rail comprises a low side switching device, and
   a charging switching device coupled between the other port of the capacitive element and a predetermined voltage level, for charging the capacitive element when the high side switching device and the charging switching device are both in an ON state.

2. The voltage regulator according to claim 1, further comprising:
   one or more further negative output rails, each comprising a respective low side switching device coupled between the second intermediate node and a respective output port.

3. The voltage regulator according to claim 1, further comprising:
   one or more second capacitive elements, and
   for each of the second capacitive elements, a respective intermediate switching device, a respective bypass switching device and a respective second charging switching device;
   wherein the intermediate switching devices and the second capacitive elements are alternatingly coupled in series between the other port of the capacitive element and the second intermediate node,
   each of the bypass switching devices is coupled between the first intermediate node and a port of the respective second capacitive element that is coupled to the respective intermediate switching device, and
   each of the second charging switching devices is coupled between the other port of the respective second capacitive element and the predetermined voltage level, for charging the respective second capacitive element when the high side switching device, the respective bypass switching device and the respective second charging device are all in the ON state.

4. The voltage regulator according to claim 3, further comprising an intermediate output port for outputting an intermediate output voltage, coupled to the other port of one of the one or more second capacitive elements.

5. The voltage regulator according to claim 1, further comprising:
   a boost low side switching device coupled between the other port of the inductive element and the predetermined voltage level, and
   a positive output rail coupled between a respective output port and a third intermediate node arranged between the other port of the inductive element and the boost low side switching device, wherein the positive output rail comprises a boost high side switching device.

6. The voltage regulator according to claim 5, further comprising:
   one or more further positive output rails, each comprising a respective boost high side switching device coupled between the third intermediated node and a respective output port.

7. The voltage regulator according to claim 5, further comprising:
   a first switching device coupled between the one port of the capacitive element and the first intermediate node, for switchably connecting the one port of the capacitive element to the first intermediate node, and
   a second switching device coupled between the one port of the capacitive element to the output port of the positive output rail, for switchably connecting the one port of the capacitive element to the output port of the positive output rail.

8. A DC-DC voltage regulator for converting an input voltage at an input port into one or more output voltages at respective output ports, the voltage regulator comprises:
   a high side switching device coupled between the input port and a first intermediate node,
   a first switching device, a capacitive element and a charging switching device coupled in series between the first intermediate node and a first predetermined voltage level,
   an inductive element and a boost low side switching device coupled in series between the first intermediate node and the first predetermined voltage level,
   a negative output rail coupled between a first output port and a second intermediate node arranged between one port of the capacitive element and the charging switching device, wherein the negative output rail comprises a low side switching device,
   a positive output rail coupled between a second output port and a third intermediate node arranged between the inductive element and the boost low side switching device, wherein the positive output rail comprises a boost high side switching device, and
   a second switching device coupled between a second voltage level and the other port of the capacitive element, wherein the second voltage level is higher than the first predetermined voltage level.

9. The voltage regulator according to claim 8, further comprising:
   a second capacitive element coupled between the third intermediate node and the positive output rail, wherein a fourth intermediate node is arranged between the second capacitive element and the positive output rail, and
   a third switching device coupled between the input port and the fourth intermediate node.

10. The voltage regulator according to claim 8, wherein the second voltage level is the respective output voltage at the output port of the positive output rail or an external supply voltage.

11. A DC-DC voltage regulator for converting an input voltage at an input port into one or more output voltages respectively at respective output ports, the voltage regulator comprising:
- a high side switching device coupled between the input port and a first intermediate node,
- an inductive element and a capacitive element coupled in series between the first intermediate node and a second intermediate node,
- one or more positive output rails, each coupled between the second intermediate node and a respective output port, wherein each of the one or more positive output rails comprises a respective boost high side switching device,
- a switching device coupled between the input port and the second intermediate node, and
- a charging switching device coupled between a first predetermined voltage level and a third intermediate node arranged between the inductive element and the capacitive element, for charging the capacitive element when the switching device and the charging switching device are both in an ON state.

12. The voltage regulator according to claim 11, further comprising:
- a second switching device, a second capacitive element and a second charging switching device coupled in series between the first intermediate node and the first predetermined voltage level,
- a third switching device coupled between a second voltage level and a fourth intermediate node arranged between the second switching device and one port of the second capacitive element, and
- one or more negative output rails coupled between the other port of the second capacitive element and the respective output ports, each comprising a respective low side switching device;
- wherein the second voltage level is higher than the first predetermined voltage level, and optionally, the second voltage level is the respective output voltage at the respective output port of one of the positive output rails or an external supply voltage.

13. A method for operating a DC-DC voltage regulator for converting an input voltage at an input port into one or more output voltages respectively at respective output ports,
wherein the voltage regulator comprises:
- a high side switching device coupled between the input port and a first intermediate node,
- an inductive element having one port coupled to the first intermediate node,
- a capacitive element having two ports, coupled between the first intermediate node and a second intermediate node, with its one port coupled to the first intermediated node,
- a negative output rail coupled between the second intermediate node and one of the output ports, wherein the negative output rail comprises a low side switching device, and
- a charging switching device coupled between the other port of the capacitive element and a predetermined voltage level; and wherein the method comprises:
- in a first operation phase, switching the high side switching device and the charging switching device to an ON state and switching the low side switching device to an OFF state, for charging the capacitive element, and
- in a second operation phase, switching the high side and the charging switching devices to the OFF state and switching the low side switching device to the ON state, for generating an output voltage at the output port.

14. The method according to claim 13, wherein the voltage regulator further comprises:
- one or more further negative output rails, each comprising a respective low side switching device coupled between the second intermediated node and a respective output port; and wherein the method further comprises:
- in the second operation phase, switching the high side and the charging switching devices to the OFF state and switching one of the low side switching devices to the ON state, for generating an output voltage at the respective output port of the negative output rail of the one of the low side switching devices.

15. The method according to claim 13, wherein the voltage regulator further comprises:
- one or more second capacitive elements, and
- for each of the second capacitive element, a respective intermediate switching device, a respective bypass switching device and a respective second charging switching device;
- wherein the intermediate switching devices and the second capacitive elements are alternatingly coupled in series between the other port of the capacitive element and the second intermediate node,
- each of the bypass switching devices is coupled between the first intermediate node and one port of the respective second capacitive element that is coupled to the respective intermediate switching device, and
- each of the second charging switching devices is coupled between the other port of the respective second capacitive element and the predetermined voltage level; and
- wherein the method further comprises, for a given one among the one or more second capacitive elements:
- in the first operation phase, switching the respective second charging switching device and the respective bypass switching device to the ON state for charging the given second capacitive element, and
- in the second operation phase, switching the respective intermediate switching device coupled to the given second capacitive element to the ON state and switching the respective seconding charging switching device and respective bypass switching device to the OFF state.

16. The method according to claim 15, wherein the voltage regulator further comprises:
- an intermediate output port coupled to the other port of one of the one or more second capacitive elements and the respective second charging switching device; and wherein the method further comprises:
- providing an intermediate output voltage at the intermediate output port.

17. The method according to claim 13, wherein the voltage regulator further comprises:
- a boost low side switching device coupled between the other port of the inductive element and the predetermined voltage level, and
- a positive output rail coupled between a respective output port and a third intermediate node arranged between the other port of the inductive element and the boost low side switching device, wherein the positive output rail comprises a boost high side switching device; and wherein the method further comprises:
- in both the first operation phase and the second operation phase, switching the boost low side switching device to the ON state and switching the boost high side switching device to the OFF state.

18. The method according to claim 17, wherein the method further comprises:

in a third operation phase, switching the high side switching device and the boost low side switching device to the ON state and switching the low side switching device, the charging switching device and the boost high side switching device to the OFF state, and in a fourth operation phase, switching the boost low side switching device to the OFF state and switching the boost high side switching device to the ON state.

19. A method for operating a DC-DC voltage regulator for converting an input voltage at an input port into one or more output voltages respectively at respective output ports, wherein the voltage regulator comprises:

a high side switching device coupled between the input port and a first intermediate node, a first switching device, a capacitive element and a charging switching device coupled in series between the first intermediate node and a first predetermined voltage level, an inductive element and a boost low side switching device coupled in series between the first intermediate node and the first predetermined voltage level, a negative output rail coupled between a first output port and a second intermediate node arranged between one port of the capacitive element and the charging switching device, wherein the negative output rail comprises a low side switching device, a positive output rail coupled between a second output port and a third intermediate node arranged between the inductive element and the boost low side switching device, wherein the positive output rail comprises a boost high side switching device, and a second switching device coupled between a second voltage level and the other port of the capacitive element, wherein the second voltage level is higher than the first predetermined voltage level; and wherein the method comprises:

in a first operation phase, switching the high side switching device, the second switching device, the boost low side switching device, and the charging switching device to an ON state and switching the first switching device, the low side switching device, and the boost high side switching device to an OFF state, for charging the capacitive element, and in a second operation phase, switching the first switching device, the boost low side switching device, and the low side switching device to the ON state and switching the high side switching device, the boost high side switching device, the second switching device, and the charging switching device to the OFF state.

20. A method for operating a DC-DC voltage regulator for converting an input voltage at an input port into one or more output voltages respectively at respective output ports, wherein the voltage regulator comprises:

a high side switching device coupled between the input port and a first intermediate node, an inductive element and a capacitive element coupled in series between the first intermediate node and a second intermediate node, one or more positive output rails, each coupled between the second intermediate node and a respective output port, wherein each of the one or more positive output rails comprises a respective boost high side switching device, a switching device coupled between the input port and the second intermediate node, and a charging switching device coupled between a first predetermined voltage level and a third intermediate node arranged between the inductive element and the capacitive element; and wherein the method comprises:

in a first operation phase, switching the switching device and the charging switching device to an ON state and switching the high side switching device and all the boost high side switching devices to an OFF state, for charging the capacitive element, and in a second operation phase, switching the high side and a selected boost high side switching device of the one or more positive output rails to the ON state and switching the switching device and the charging switching device to the OFF state, for generating the output voltage at the respective selected output port.

21. The method according to claim 20, wherein the voltage regulator further comprise:

a second switching device, a second capacitive element and a second charging switching device coupled in series between the first intermediate node and the first predetermined voltage level, a third switching device coupled between the respective output port of one of the positive output rails and a fourth intermediate node arranged between the second switching device and one port of the second capacitive element, and one or more negative output rails, coupled between the other port of the second capacitive element and the respective output ports, each comprising a respective low side switching device; and wherein the method further comprises:

in a third operation phase, switching the high side switching device, the third switching device, the first charging switching device, and the second charging switching device to the ON state and switching all other switching devices to the OFF state, for charging the second capacitive element, and in a fourth operation phase, switching the second switching device, the first charging switching device, and one of the low side switching devices to the ON state and switching all other switching devices to the OFF state, for generating an output voltage at the respective output port of the negative output rail of the one of the low side switching devices.

* * * * *